United States Patent
Hu et al.

(10) Patent No.: US 9,511,567 B2
(45) Date of Patent: Dec. 6, 2016

(54) MULTILAYERED POLYOLEFIN-BASED FILMS

(71) Applicant: Dow Global Technologies LLC, Midland, MI (US)

(72) Inventors: Yushan Hu, Pearland, TX (US); Burcak Conley, Zurich (CH); Kim L. Walton, Lake Jackson, TX (US); Colin Li Pi Shan, Pearland, TX (US); Gary R. Marchand, Gonzales, LA (US); Rajen M. Patel, Freeport, TX (US); Eva-Maria Kupsch, Waedenswil (CH); Brian W. Walther, Clute, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/425,400

(22) PCT Filed: Sep. 13, 2013

(86) PCT No.: PCT/US2013/059743
§ 371 (c)(1),
(2) Date: Mar. 3, 2015

(87) PCT Pub. No.: WO2014/043522
PCT Pub. Date: Mar. 20, 2014

(65) Prior Publication Data
US 2015/0217544 A1    Aug. 6, 2015

Related U.S. Application Data

(60) Provisional application No. 61/701,331, filed on Sep. 14, 2012, provisional application No. 61/739,778, filed on Dec. 20, 2012.

(51) Int. Cl.
*B32B 27/08* (2006.01)
*B32B 27/32* (2006.01)
(Continued)

(52) U.S. Cl.
CPC ............ *B32B 27/08* (2013.01); *B32B 27/306* (2013.01); *B32B 27/308* (2013.01); *B32B 27/32* (2013.01); *B32B 27/34* (2013.01); *B32B 2250/03* (2013.01);
(Continued)

(58) Field of Classification Search
None
See application file for complete search history.

(56) References Cited

U.S. PATENT DOCUMENTS 3,236,917 A    2/1966 Nata et al.
4,561,920 A    12/1985 Foster
(Continued)

FOREIGN PATENT DOCUMENTS

WO    WO2012044732 A1 *    4/2012

OTHER PUBLICATIONS

PCT/US2013/059743, International Search Report and Written Opinion of the International Searching Authority, Mailed Dec. 5, 2013.

(Continued)

*Primary Examiner* — Tahseen N Khan

(57) ABSTRACT

Disclosed are multilayer structures comprising a polyolefin layer, a tie layer and a barrier layer wherein the tie layer is a formulation comprising a crystalline block copolymer composite (CBC) comprising i) an ethylene polymer (EP) comprising at least 90 mol % polymerized ethylene; ii) an alpha-olefin-based crystalline polymer (CAOP) and iii) a block copolymer comprising (a) an ethylene polymer block comprising at least 90 mol % polymerized ethylene and (b) a crystalline alpha-olefin block (CAOB).

7 Claims, 6 Drawing Sheets

(51) Int. Cl.
*B32B 27/34* (2006.01)
*B32B 27/30* (2006.01)

(52) U.S. Cl.
CPC ........ *B32B 2250/40* (2013.01); *B32B 2274/00* (2013.01); *B32B 2307/31* (2013.01); *B32B 2307/7244* (2013.01); *B32B 2307/734* (2013.01); *B32B 2307/738* (2013.01); *B32B 2439/70* (2013.01); *Y10T 428/31757* (2015.04); *Y10T 428/31913* (2015.04)

(56) References Cited

U.S. PATENT DOCUMENTS

| | | | |
|---|---|---|---|
| 4,650,721 | A | 3/1987 | Ashcraft et al. |
| 4,950,541 | A | 8/1990 | Tabor et al. |
| 5,194,509 | A | 3/1993 | Hasenbein et al. |
| 5,716,715 | A | 2/1998 | Degrassi et al. |
| 5,919,983 | A | 7/1999 | Rosen et al. |
| 6,472,081 | B1 | 10/2002 | Tsai et al. |
| 7,199,203 | B2 | 4/2007 | Stevens et al. |
| 7,355,089 | B2 | 4/2008 | Chang et al. |
| 7,713,636 | B2 | 5/2010 | Song et al. |
| 7,897,689 | B2 | 3/2011 | Harris et al. |
| 8,476,393 | B2 | 7/2013 | Shan et al. |
| 8,785,554 | B2 | 7/2014 | Li Pi Shan et al. |
| 8,822,598 | B2 | 9/2014 | Li Pi Shan et al. |
| 8,822,599 | B2 | 9/2014 | Li Pi Shan et al. |
| 8,916,249 | B2 | 12/2014 | Liang et al. |
| 8,921,484 | B2 | 12/2014 | Liang et al. |
| 2003/0215655 | A1 | 11/2003 | Barger et al. |
| 2004/0241360 | A1 | 12/2004 | Giblin et al. |
| 2005/0058789 | A1 | 3/2005 | Nonaka et al. |
| 2006/0199930 | A1 | 9/2006 | Li Pi Shan et al. |
| 2007/0160788 | A1 | 7/2007 | Wurtzel et al. |
| 2008/0269412 | A1 | 10/2008 | Carnahan et al. |
| 2008/0274245 | A1 | 11/2008 | Lee et al. |
| 2008/0311812 | A1 | 12/2008 | Arriola et al. |
| 2011/0082249 | A1 | 4/2011 | Shan et al. |
| 2011/0082257 | A1 | 4/2011 | Carnahan et al. |
| 2011/0082258 | A1 | 4/2011 | Walton et al. |
| 2011/0313106 | A1 | 12/2011 | Shan et al. |
| 2012/0003440 | A1* | 1/2012 | Okuzu .................. B29C 55/026 428/200 |
| 2013/0177720 | A1* | 7/2013 | Liang ...................... B32B 27/32 428/35.2 |

OTHER PUBLICATIONS

PCT/US2013/059743, International Preliminary Report on Patentability, Mailed Mar. 26, 2015.
Dow Global Technologies, Inc., EP Appln. No. 13765923.1, Rule 161(1) and 162, Mailed , Apr. 21, 2015.
Dow Global Technologies, Inc., EP Appln. No. 13765923.1, Rule 161(1) and 162, Response Dated Oct. 14, 2015.

\* cited by examiner

MULTILAYERED POLYOLEFIN-BASED FILMS

FIELD OF THE INVENTION

The invention relates to a polyolefin-based heat sealable, retortable film. The invention also relates to methods of making and using the heat sealable, retortable film.

BACKGROUND OF THE INVENTION

The retort process sterilizes packaged food in its container to create a shelf-stable product. Polymeric films used in retort packaging must withstand high heat (typically 121° C. and higher) and high humidity. The current film structure for retortable food packaging contains at least three functional layers: sealant layer, barrier layer and tie layer in between. The sealant layer is generally polyolefin, preferably polypropylene for heat resistance. The barrier layer is polyamide (PA) or ethylene vinyl alcohol (EVOH) or polyvinylidene chloride (PVDC), preferably PA which maintains mechanical strength and oxygen barrier properties during the retort process. The tie layer creates interlayer adhesion between the two incompatible layers. Typically, it is maleic anhydride (MAH) functionalized polyolefins, specifically MAH-g-PP or MAH-g-PE. Since the sealant layer is preferably polypropylene (PP), the choice of the functionalized polyolefin is generally MAH-g-PP for tie layer. However, the MAH-g-PP process degrades PP and causes significant melt flow rate increase and difficulty in viscosity matching for film co-extrusion. In addition, washing is needed to remove PP oligomers and therefore cost to produce is high.

It would be desirable to provide an alternative tie layer that maintains the required seal strength and does not have haze or shrinkage issues and allows for coextrusion.

SUMMARY OF THE INVENTION

The invention provides a multilayer structure comprising a polyolefin layer (Layer A), a tie layer (Layer B) and a barrier layer (Layer C), each layer having opposing facial surfaces in adhering contact with the other layer, wherein:
Layer A has a top facial surface and a bottom facial surface and comprises a polyolefin, preferably polypropylene;
Layer B has a top facial surface and a bottom facial surface and comprises:
  a) a crystalline block composite (CBC) component comprising:
    i) an ethylene polymer (EP) comprising at least 90 mol % polymerized ethylene by weight of the ethylene polymer;
    ii) an alpha-olefin-based crystalline polymer (CAOP) and
    iii) a block copolymer comprising (a) an ethylene polymer block comprising at least 90 mol % polymerized ethylene by weight of the ethylene polymer block and (b) a crystalline alpha-olefin block (CAOB);
  b) a polyolefin elastomer; homogeneously branched ethylene/alpha-olefin copolymer;
  c) maleic anhydride grafted polyethylene (MAH-g-PE) or maleic anhydride grafted polypropylene (MAH-g-PP); and, optionally,
  d) polypropylene or polyethylene; and,
Layer C comprises a polyamide (PA) or ethylene vinyl alcohol (EVOH) and has a top facial layer and a bottom facial surface, the top facial surface of Layer C being in adhering contact with the bottom facial surface of Layer B.

DETAILED DESCRIPTION

Figure 1:
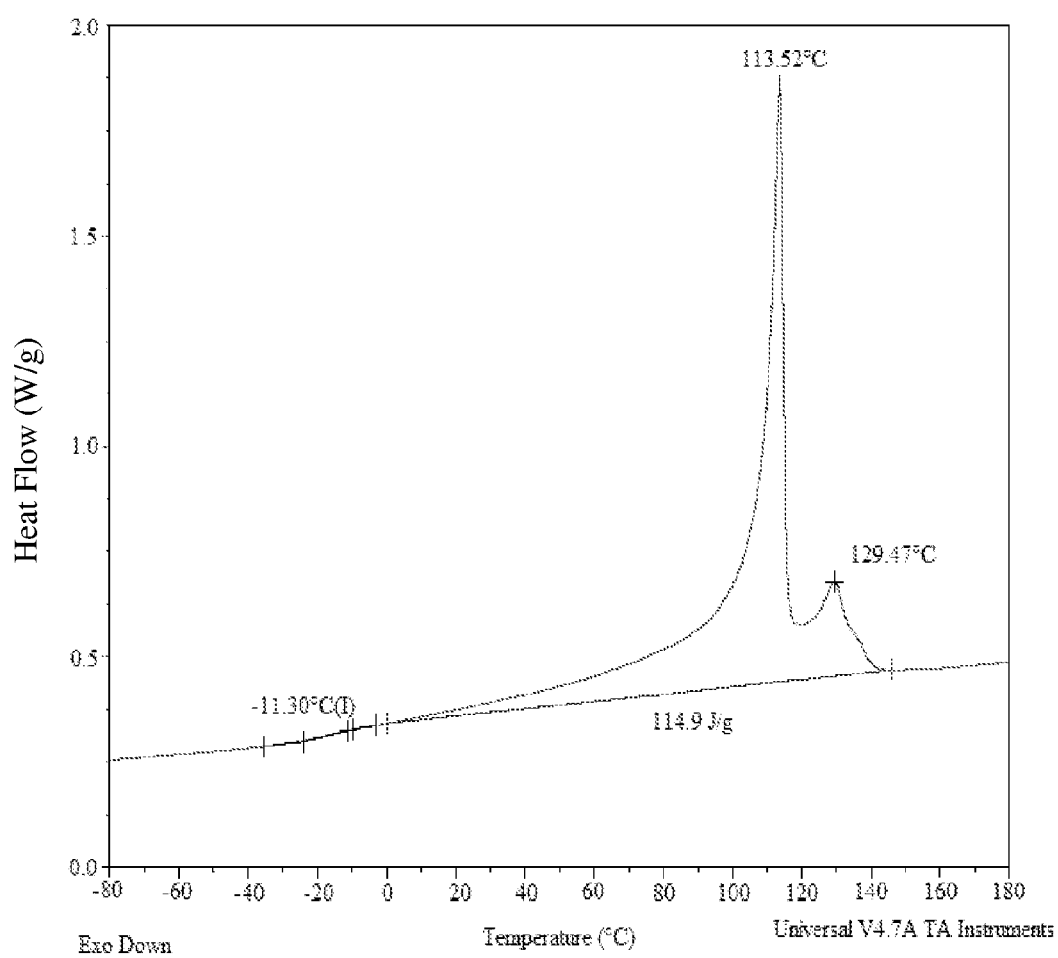
FIG. 1 shows the DSC profile of CBC1.

"Composition" and like terms mean a mixture of two or more materials, such as a polymer which is blended with other polymers or which contains additives, fillers, or the like. Included in compositions are pre-reaction, reaction and post-reaction mixtures the latter of which will include reaction products and by-products as well as unreacted components of the reaction mixture and decomposition products, if any, formed from the one or more components of the pre-reaction or reaction mixture.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

"Polymer" means a compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, etc. The terms "ethylene/α-olefin polymer" and "propylene/α-olefin polymer" are indicative of interpolymers as described below. It is noted that although a polymer is often referred to as being "made of" monomers, "based on" a specified monomer or monomer type, "containing" a specified monomer content, or the like, this is obviously understood to be referring to the polymerized remnant of the specified monomer and not to the unpolymerized species.

"Interpolymer" means a polymer prepared by the polymerization of at least two different monomers. This generic term includes copolymers, usually employed to refer to polymers prepared from two or more different monomers, and includes polymers prepared from more than two different monomers, e.g., terpolymers, tetrapolymers, etc.

"Polyolefin", "polyolefin polymer", "polyolefin resin" and like terms mean a polymer produced from a simple olefin (also called an alkene with the general formula $C_nH_{2n}$) as a monomer. Polyethylene is produced by polymerizing ethylene with or without one or more comonomers, polypropylene by polymerizing propylene with or without one or more comonomers, etc. Thus, polyolefins include interpolymers such as ethylene/α-olefin copolymers, propylene/α-olefin copolymers, etc.

"Melting Point" as used here (also referred to a melting peak in reference to the shape of the plotted DSC curve) is typically measured by the DSC (Differential Scanning calorimetry) technique for measuring the melting points or peaks of polyolefins as described in U.S. Pat. No. 5,783,638. It should be noted that many blends comprising two or more polyolefins will have more than one melting point or peak; many individual polyolefins will comprise only one melting point or peak.

The multi-layer structures have three or more layers of Layer A, Layer B and Layer C, in a structure such as A/B/C, or preferably in the structure of A/B/C/B/D wherein A is a polyolefin layer, C is a barrier layer, B is a tie layer that provides adhesion between the polyolefin layer and the barrier layer, and D is a sealant layer. Layer A and Layer D may be the same or different compositions. Optionally, 7 layer structures and more layers can be incorporated for added functionality with repeating units of A/B/C or A/B/C/B/D, for example.

The components of Layer B may be present in the following amounts based on the total polymer weight of Layer B: 20 wt % to 90 wt %, preferably 40-60 wt % CBC; optionally 0 wt % to 30 wt %, preferably 10 wt % to 30 wt % polyolefin elastomer; 10 wt % to 30 wt % maleic anhydride grafted polyethylene (MAH-g-PE); and, optionally, 0 wt % to 20 wt %, polypropylene or 0 wt % to 20 wt %, polyethylene. The grafted MAH concentration in Layer B formulation can range from 0.05 to 1.0%. Optionally, MAH-g-PE can be substituted by maleic anhydride grafted polypropylene (MAH-g-PP) or a combination of MAH-g-PE and MAH-g-PP.

The tie layer, Layer B, formulation comprises a polyolefin elastomer. Suitable polyolefin elastomers include any polyethylene or polypropylene based elastomer including homogeneously branched ethylene/alpha-olefin copolymer, propylene/alpha-olefin interpolymer, and ethylene-propylene-diene monomer rubber (EPDM).

The homogeneously branched ethylene/alpha-olefin copolymer can be made with a single-site catalyst such as a metallocene catalyst or constrained geometry catalyst, and typically have a melting point of less than 105, preferably less than 90, more preferably less than 85, even more preferably less than 80 and still more preferably less than 75° C. The melting point is measured by differential scanning calorimetry (DSC) as described, for example, in U.S. Pat. No. 5,783,638. The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, α-methylstyrene, etc.) are α-olefins for purposes of this invention. Illustrative homogeneously branched ethylene/alpha-olefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random or blocky.

More specific examples of homogeneously branched ethylene/alpha-olefin interpolymers useful in this invention include homogeneously branched, linear ethylene/α-olefin copolymers (e.g. TAFMER® by Mitsui Petrochemicals Company Limited and EXACT® by Exxon Chemical Company), and the homogeneously branched, substantially linear ethylene/α-olefin polymers (e.g., AFFINITY™ and ENGAGE™ polyethylene available from The Dow Chemical Company). The substantially linear ethylene copolymers are especially preferred, and are more fully described in U.S. Pat. Nos. 5,272,236, 5,278,272 and 5,986,028. Blends of any of these interpolymers can also be used in the practice of this invention. In the context of this invention, homogeneously branched ethylene/alpha-olefin interpolymers are not olefin block copolymers.

The polypropylene that can be used as the polyolefin layer, Layer A, sealant layer, Layer D, if present, and optionally in the tie layer, Layer B, can be homopolymer (hPP), random copolymer polypropylene (rcPP), impact copolymer polypropylene (hPP+at least one elastomeric impact modifier) (ICPP) or high impact polypropylene (HIPP), high melt strength polypropylene (HMS-PP), isotactic polypropylene (iPP), syndiotactic polypropylene (sPP), and combinations thereof.

The polypropylene that can be used in the polyolefin layer, Layer A, sealant layer, Layer D, if present, and optionally in the tie layer, Layer B, can also be a propylene-alpha-olefin interpolymer. The propylene-alpha-olefin interpolymer is characterized as having substantially isotactic propylene sequences. The propylene-alpha-olefin interpolymers include propylene-based elastomers (PBE). "Substantially isotactic propylene sequences" means that the sequences have an isotactic triad (mm) measured by $^{13}$C NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}$C NMR spectra.

The propylene/alpha-olefin interpolymer may have a melt flow rate in the range of from 0.1 to 500 grams per 10 minutes (g/10 min), measured in accordance with ASTM D-1238 (at 230° C./2.16 Kg). All individual values and subranges from 0.1 to 500 g/10 min are included herein and disclosed herein; for example, the melt flow rate can be from a lower limit of 0.1 g/10 min, 0.2 g/10 min, or 0.5 g/10 min to an upper limit of 500 g/10 min, 200 g/10 min, 100 g/10 min, or 25 g/10 min. For example, the propylene/alpha-olefin copolymer may have a melt flow rate in the range of from 0.1 to 200 g/10 min; or in the alternative, the propylene/alpha-olefin copolymer may have a melt flow rate in the range of from 0.2 to 100 g/10 min; or in the alternative, the propylene/alpha-olefin copolymer may have a melt flow rate in the range of from 0.2 to 50 g/10 min; or in the alternative, the propylene/alpha-olefin copolymer may have a melt flow rate in the range of from 0.5 to 50 g/10 min; or in the alternative, the propylene/alpha-olefin copolymer may have a melt flow rate in the range of from 1 to 50 g/10 min; or in the alternative, the propylene/alpha-olefin copolymer may have a melt flow rate in the range of from 1 to 40 g/10 min; or in the alternative, the propylene/alpha-olefin interpolymer may have a melt flow rate in the range of from 1 to 30 g/10 min.

The propylene/alpha-olefin interpolymer has crystallinity in the range of from at least 1 percent by weight (a heat of fusion (Hf) of at least 2 Joules/gram (J/g)) to 30 percent by weight (a Hf of less than 50 J/g). All individual values and subranges from 1 percent by weight (a Hf of at least 2 J/g) to 30 percent by weight (a Hf of less than 50 J/g) are included herein and disclosed herein; for example, the crystallinity can be from a lower limit of 1 percent by weight (a Hf of at least 2 J/g), 2.5 percent (a Hf of at least 4 J/g), or 3 percent (a Hf of at least 5 J/g) to an upper limit of 30 percent by weight (a Hf of less than 50 J/g), 24 percent by weight (a Hf of less than 40 J/g), 15 percent by weight (a Hf of less than 24.8 J/g) or 7 percent by weight (a Hf of less than 11 J/g). For example, the propylene/alpha-olefin copolymer may have a crystallinity in the range of from at least 1 percent by weight (a Hf of at least 2 J/g) to 24 percent by weight (a Hf of less than 40 J/g); or in the alternative, the propylene/alpha-olefin copolymer may have a crystallinity in the range of from at least 1 percent by weight (a Hf of at least 2 J/g to 15 percent by weight (a Hf of less than 24.8 J/g); or in the alternative, the propylene/alpha-olefin copolymer may have a crystallinity in the range of from at least 1 percent by weight (a Hf of at least 2 J/g) to 7 percent by weight (a Hf of less than 11 J/g); or in the alternative, the propylene/alpha-olefin copolymer may have a crystallinity in the range of Hf of less than 8.3 J/g). The crystallinity is measured by differential scanning calorimetry (DSC) as described in U.S. Pat. No. 7,199,203. The propylene/alpha-olefin copolymer comprises units derived from propylene and polymeric units derived from one or more alpha-olefin comonomers. Exemplary comonomers utilized to manufacture the propylene/alpha-olefin copolymer are $C_2$ and $C_4$ to $C_{10}$ alpha-olefins; for example, $C_2$, $C_4$, $C_6$ and $C_8$ alpha-olefins.

The propylene/alpha-olefin interpolymer comprises from 1 to 40 percent by weight of one or more alpha-olefin comonomers. All individual values and subranges from 1 to 40 weight percent are included herein and disclosed herein; for example, the comonomer content can be from a lower limit of 1 weight percent, 3 weight percent, 4 weight percent, 5 weight percent, 7 weight percent, or 9 weight percent to an upper limit of 40 weight percent, 35 weight percent, 30 weight percent, 27 weight percent, 20 weight percent, 15 weight percent, 12 weight percent, or 9 weight percent. For example, the propylene/alpha-olefin copolymer comprises from 1 to 35 percent by weight of one or more alpha-olefin comonomers; or in the alternative, the propylene/alpha-olefin copolymer comprises from 1 to 30 percent by weight of one or more alpha-olefin comonomers; or in the alternative, the propylene/alpha-olefin copolymer comprises from 3 to 27 percent by weight of one or more alpha-olefin comonomers; or in the alternative, the propylene/alpha-olefin copolymer comprises from 3 to 20 percent by weight of one or more alpha-olefin comonomers; or in the alternative, the propylene/alpha-olefin copolymer comprises from 3 to 15 percent by weight of one or more alpha-olefin comonomers.

The propylene/alpha-olefin interpolymer has a density of typically less than 0.895 g/cm³; or in the alternative, less than 0.890 g/cm³; or in the alternative, less than 0.880 g/cm³; or in the alternative, less than 0.870 g/cm³. The propylene/alpha-olefin interpolymer has a density of typically greater than 0.855 g/cm³; or in the alternative, greater than 0.860 g/cm³; or in the alternative, greater than 0.865 g/cm³.

The propylene/alpha-olefin interpolymer has a melting temperature (Tm) typically of less than 120° C.; or in the alternative, <100° C.; or in the alternative, <90° C.; or in the alternative, <80° C.; or in the alternative, <70° C.; and a heat of fusion (Hf) typically of less than 70 Joules per gram (J/g) as measured by differential scanning calorimetry (DSC) as described in U.S. Pat. No. 7,199,203.

The propylene/alpha-olefin interpolymer has a molecular weight distribution (MWD), defined as weight average molecular weight divided by number average molecular weight ($M_w/M_n$) of 3.5 or less; or 3.0 or less; or from 1.8 to 3.0.

Such propylene/alpha-olefin interpolymers are further described in the U.S. Pat. Nos. 6,960,635 and 6,525,157. Such propylene/alpha-olefin interpolymers are commercially available from The Dow Chemical Company, under the trade name VERSIFY, or from ExxonMobil Chemical Company, under the trade name VISTAMAXX.

The polypropylene that can be used in the polyolefin layer, Layer A, sealant layer, Layer D, if present, and optionally in the tie layer, Layer B, can also be EPDM materials. EPDM materials are linear interpolymers of ethylene, propylene, and a nonconjugated diene such as 1,4-hexadiene, dicyclopentadiene, or ethylidene norbornene. A preferred class of interpolymers having the properties disclosed herein is obtained from polymerization of ethylene, propylene, and a non-conjugated diene to make an EPDM elastomer. Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

In some embodiments, the EPDM polymers have an ethylene content of from 50% to 75% by weight, a propylene content of from 20% to 49% by weight, and a nonconjugated diene content from 1% to 10% by weight, all weights based upon the total weight of the polymer. Examples of representative EPDM polymers for use include Nordel IP 4770R, Nordel 3722 IP available from The Dow Chemical Company, Midland, Mich., Vistalon 3666 available from ExxonMobil, Baton Rouge, La., and Keltan 5636A available from DSM Elastomers Americas, Addis, La.

The EPDM polymers, also known as elastomeric copolymers of ethylene, a higher-alpha-olefin and a polyene, have molecular weights from 20,000 to 2,000,000 daltons or more. Their physical form varies from waxy materials to rubbers to hard plastic-like polymers. They have dilute solution viscosities (DSV) from 0.5 to 10 dl/g, measured at 30° C. on a solution of 0.1 gram of polymer in 100 cc of toluene. The EPDM polymers also have a Mooney viscosity of greater than 50 ML (1+4) at 125° C.; and, a density of 0.870 g/cc to 0.885 g/cc or from 0.875 g/cc to 0.885 g/cc.

The polyethylene optionally used in the tie layer, Layer B, is selected from ultralow density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultrahigh density polyethylene (UHDPE), and combinations thereof. In a further embodiment, the polyethylene has a density greater than 0.950 g/cc (i.e., a HDPE).

The MAH-g-PE used in the tie layer, Layer B, is a maleic anhydride grafted polyethylene. The grafted polyethylene may be any of the polyethylenes as described above. The amount of maleic anhydride constituent grafted onto the polyethylene chain is greater than 0.05 weight percent to 2.0 wt percent (based on the weight of the olefin interpolymer), as determined by titration analysis, FTIR analysis, or any other appropriate method. More preferably, this amount is greater than 0.25 weight percent to 2.0 weight percent, and in yet a further embodiment, this amount is greater than 0.3 weight percent to 2.0 weight percent. In a preferred embodiment, 0.5 weight percent to 2.0 weight percent of maleic anhydride is grafted.

The graft process for MAH-g-PE can be initiated by decomposing initiators to form free radicals, including azo-containing compounds, carboxylic peroxyacids and peroxyesters, alkyl hydroperoxides, and dialkyl and diacyl peroxides, among others. Many of these compounds and their properties have been described (Reference: J. Branderup, E. Immergut, E. Grulke, eds. "Polymer Handbook," 4th ed., Wiley, New York, 1999, Section II, pp. 1-76). It is preferable for the species that is formed by the decomposition of the initiator to be an oxygen-based free radical. It is more preferable for the initiator to be selected from carboxylic peroxyesters, peroxyketals, dialkyl peroxides, and diacyl peroxides. Some of the more preferable initiators, commonly used to modify the structure of polymers, are listed in U.S. Pat. No. 7,897,689, in the table spanning Col. 48 line 13-Col. 49 line 29, which is hereby incorporated by reference. Alternatively, the grafting process for MAH-g-PE can be initiated by free radicals generated by thermal oxidative process.

Optionally, a MAH-g-PP concentrate may be used. The grafted polyethylene may be any of the polypropylenes as described for Layer A. The amount of maleic anhydride constituent grafted onto the polyethylene chain is greater than 0.05 weight percent to 2.0 wt percent (based on the weight of the olefin interpolymer), as determined by titration analysis, FTIR analysis, or any other appropriate method. More preferably, this amount is greater than 0.25 weight percent to 2.0 weight percent, and in yet a further embodiment, this amount is greater than 0.3 weight percent to 2.0 weight percent. In a preferred embodiment, 0.5 weight percent to 2.0 weight percent of maleic anhydride is grafted.

Optionally, MAH-g-PE can be replaced or combined with a variety of grafted polyolefins that comprising radically graftable species. These species include unsaturated molecules, each containing at least one heteroatom. These species include, but are not limited to, maleic anhydride, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, and the respective esters, imides, salts, and Diels-Alder adducts of these compounds.

The barrier layer, Layer C, may comprise one or more polyamides (nylons), ethylene vinyl alcohol copolymers (EVOH), polyvinylidene chloride, polycarbonate, or combination of two or more thereof and can include a scavenger materials and compounds of heavy metals like cobalt with MXD6 nylon.

EVOH includes a vinyl alcohol copolymer having 27 to 44 mol % ethylene, and is prepared by, for example, hydrolysis of vinyl acetate copolymers. EVOH is available as EVAL™ from Kuraray and Noltex™ from Nippon Goshei.

The polyamide can include polymiade 6, polyamide 9, polyamide 10, polyamide 11, polyamide 12, polyamide 6,6, polyamide 6/66 and aromatic polyamide such as polyamide 6I, polyamide 6T, MXD6, or combinations for two or more thereof.

The compositions disclosed herein optionally can comprise an antioxidant or a stabilizer. Any antioxidant known to a person of ordinary skill in the art may be used in the adhesion composition disclosed herein. Non-limiting examples of suitable antioxidants include amine-based antioxidants such as alkyl diphenylamines, phenyl-α-naphthylamine, alkyl or aralkyl substituted phenyl-α-naphthylamine, alkylated p-phenylene diamines, tetramethyl-diaminodiphenylamine and the like; and hindered phenol compounds such as 2,6-di-t-butyl-4-methylphenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamate)]methane (e.g., IRGANO$^X$™ 1010, from Ciba Geigy, New York); octadecyl-3,5-di-t-butyl-4-hydroxycinnamate (e.g., IRGANO$^X$™ 1076, commercially available from Ciba Geigy) and combinations thereof. Where used, the amount of the antioxidant in the composition can be from greater than 0 to 1 wt %, from 0.05 to 0.75 wt %, or from 0.1 to 0.5 wt % of the total weight of the composition.

In further embodiments, the compositions disclosed herein optionally can comprise an UV stabilizer that may prevent or reduce the degradation of the compositions by UV radiation. Any UV stabilizer known to a person of ordinary skill in the art may be used in the adhesion composition disclosed herein. Non-limiting examples of suitable UV stabilizers include benzophenones, benzotriazoles, aryl esters, oxanilides, acrylic esters, Formamidine carbon black, hindered amines, nickel quenchers, hindered amines, phenolic antioxidants, metallic salts, zinc compounds and combinations thereof. Where used, the amount of the UV stabilizer in the composition can be from greater than 0 to 1 wt %, from 0.05 to 0.75 wt %, or from 0.1 to 0.5 wt % of the total weight of the composition.

In further embodiments, the compositions disclosed herein optionally can comprise a colorant or pigment. Any colorant or pigment known to a person of ordinary skill in the art may be used in the adhesion composition disclosed herein. Non-limiting examples of suitable colorants or pigments include inorganic pigments such as titanium dioxide and carbon black, phthalocyanine pigments, and other organic pigments such as IRGAZIN®, CROMOPHTAL®, MONASTRAL®, CINQUASIA®, IRGALITE®, ORASOL®, all of which are available from Ciba Specialty Chemicals, Tarrytown, N.Y. Where used, the amount of the colorant or pigment in the composition can be from greater than 0 to 10 wt %, from 0.1 to 5 wt %, or from 0.5 to 2 wt % of the total weight of the composition.

The composition of Layer B in the films according to the present invention, often referred to as a "tie" layer, is selected to be adhered, either preferably by co-extrusion or alternatively but less preferably by a lamination process (such as extrusion lamination, thermal lamination, or adhesive lamination) to the layers C and optionally A (or optionally another layer) in production of the films according to the invention. As mentioned above, Layer B comprises a Crystalline Block Copolymer Composite Resin ("CBC")

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In a preferred embodiment, the blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers of the invention are characterized by unique distributions of both polymer polydispersity (PDI or Mw/Mn) and block length distribution, due, in a preferred embodiment, to the effect of a shuttling agent(s) in combination with the catalyst(s).

The term "crystalline block composite" (CBC) (including the term "crystalline block copolymer composite") refers to a composite comprising three parts: a crystalline ethylene based polymer (CEP), a crystalline alpha-olefin based polymer (CAOP), and a block copolymer having a crystalline ethylene block (CEB) and a crystalline alpha-olefin block (CAOB), wherein the CEB of the block copolymer is the same composition as the CEP in the block composite and the CAOB of the block copolymer is the same composition as the CAOP of the block composite. The three parts are present together as one component. Additionally, the compositional split between the amount of CEP and CAOP will be the same as that between the corresponding blocks in the block copolymer. The block copolymers can be linear or branched. More specifically, each of the respective block segments can contain long chain branches, but the block copolymer segment is substantially linear as opposed to containing grafted or branched blocks. When produced in a continuous process, the crystalline block composites desirably possess PDI from 1.7 to 15, preferably 1.8 to 10, preferably from 1.8 to 5, more preferably from 1.8 to 3.5. Such crystalline block composites are described in, for example, the following filed patent applications: PCT/US11/41189; U.S. Ser. No. 13/165,054; PCT/US11/41191; U.S. Ser. No. 13/165,073; PCT/US11/41194; and U.S. Ser. No. 13/165,096; all filed on 21 Jun. 2011 and incorporated herein by reference with respect to descriptions of the crystalline block composites, processes to make them and methods of analyzing them.

CAOB refers to highly crystalline blocks of polymerized alpha olefin units in which the monomer is present in an amount greater than 90 mol %, preferably greater than 93 mol percent, more preferably greater than 95 mol percent, and preferably greater than 96 mol percent. In other words, the comonomer content in the CAOBs is less than 10 mol percent, and preferably less than 7 mol percent, and more preferably less than 5 mol percent, and most preferably less than 4 mol %. CAOBs with propylene crystallinity have corresponding melting points that are 80° C. and above, preferably 100° C. and above, more preferably 115° C. and above, and most preferably 120° C. and above. In some embodiments, the CAOB comprise all or substantially all propylene units. CEB, on the other hand, refers to blocks of polymerized ethylene units in which the comonomer content is 10 mol % or less, preferably between 0 mol % and 10 mol %, more preferably between 0 mol % and 7 mol % and most preferably between 0 mol % and 5 mol %. Such CEB have corresponding melting points that are preferably 75° C. and above, more preferably 90° C., and 100° C. and above.

"Hard" segments refer to highly crystalline blocks of polymerized units in which the monomer is present in an amount greater than 90 mol percent, and preferably greater than 93 mol percent, and more preferably greater than 95 mol percent, and most preferably greater than 98 mol percent. In other words, the comonomer content in the hard segments is most preferably less than 2 mol percent, and more preferably less than 5 mol percent, and preferably less than 7 mol percent, and less than 10 mol percent. In some embodiments, the hard segments comprise all or substantially all propylene units. "Soft" segments, on the other hand, refer to amorphous, substantially amorphous or elastomeric blocks of polymerized units in which the comonomer content is greater than 10 mol % and less than 90 mol % and preferably greater than 20 mol % and less than 80 mol %, and most preferably greater than 33 mol % and less than 75 mol %.

The CBCs are preferably prepared by a process comprising contacting an addition polymerizable monomer or mixture of monomers under addition polymerization conditions with a composition comprising at least one addition polymerization catalyst, a cocatalyst and a chain shuttling agent, said process being characterized by formation of at least some of the growing polymer chains under differentiated process conditions in two or more reactors operating under steady state polymerization conditions or in two or more zones of a reactor operating under plug flow polymerization conditions. In a preferred embodiment, the CBCs comprise a fraction of block polymer which possesses a most probable distribution of block lengths.

Suitable processes useful in producing the block composites and crystalline block composites may be found, for example, in US Patent Application Publication No. 2008/0269412, published on Oct. 30, 2008, which is herein incorporated by reference.

When producing a block polymer having a crystalline ethylene block (CEB) and a crystalline alpha-olefin block (CAOB) in two reactors or zones it is possible to produce the CEB in the first reactor or zone and the CAOB in the second reactor or zone or to produce the CAOB in the first reactor or zone and the CEB in the second reactor or zone. It is more advantageous to produce CEB in the first reactor or zone with fresh chain shuttling agent added. The presence of increased levels of ethylene in the reactor or zone producing CEB will typically lead to much higher molecular weight in that reactor or zone than in the zone or reactor producing CAOB. The fresh chain shuttling agent will reduce the MW of polymer in the reactor or zone producing CEB thus leading to better overall balance between the length of the CEB and CAOB segments.

When operating reactors or zones in series it is necessary to maintain diverse reaction conditions such that one reactor produces CEB and the other reactor produces CAOB. Carryover of ethylene from the first reactor to the second reactor (in series) or from the second reactor back to the first reactor through a solvent and monomer recycle system is preferably minimized There are many possible unit operations to remove this ethylene, but because ethylene is more volatile than higher alpha olefins one simple way is to remove much of the unreacted ethylene through a flash step by reducing the pressure of the effluent of the reactor producing CEB and flashing off the ethylene. A more preferable approach is to avoid additional unit operations and to utilize the much greater reactivity of ethylene versus higher alpha olefins such that the conversion of ethylene across the CEB reactor approaches 100%. The overall conversion of monomers across the reactors can be controlled by maintaining the alpha olefin conversion at a high level (90 to 95%).

Suitable catalysts and catalyst precursors for use in preparing CBCs include metal complexes such as disclosed in WO2005/090426, in particular, those disclosed starting on page 20, line 30 through page 53, line 20, which is herein incorporated by reference. Suitable catalysts are also disclosed in US 2006/0199930; US 2007/0167578; US 2008/0311812; U.S. Pat. No. 7,355,089 B2; or WO 2009/012215, which are herein incorporated by reference with respect to catalysts.

Preferably, the CBCs comprise propylene, 1-butene or 4-methyl-1-pentene and one or more comonomers. Preferably, the block polymers of the CBCs comprise in polymerized form propylene and ethylene and/or one or more $C_{4-20}$ α-olefin comonomers, and/or one or more additional copolymerizable comonomers or they comprise 4-methyl-1-pentene and ethylene and/or one or more $C_{4-20}$ α-olefin comonomers, or they comprise 1-butene and ethylene, propylene and/or one or more $C_5$-$C_{20}$ α-olefin comonomers and/or one or more additional copolymerizable comonomers. Additional suitable comonomers are selected from diolefins, cyclic olefins, and cyclic diolefins, halogenated vinyl compounds, and vinylidene aromatic compounds.

Comonomer content in the resulting CBCs may be measured using any suitable technique, with techniques based on nuclear magnetic resonance (NMR) spectroscopy preferred. It is highly desirable that some or all of the polymer blocks comprise amorphous or relatively amorphous polymers such as copolymers of propylene, 1-butene or 4-methyl-1-pentene and a comonomer, especially random copolymers of propylene, 1-butene or 4-methyl-1-pentene with ethylene, and any remaining polymer blocks (hard segments), if any, predominantly comprise propylene, 1-butene or 4-methyl-1-pentene in polymerized form. Preferably such segments are highly crystalline or stereospecific polypropylene, polybutene or poly-4-methyl-1-pentene, especially isotactic homopolymers.

Further preferably, the block copolymers of the CBCs comprise from 10 to 90 weight percent crystalline or relatively hard segments and 90 to 10 weight percent amorphous or relatively amorphous segments (soft segments), preferably from 20 to 80 weight percent crystalline or relatively hard segments and 80 to 20 weight percent amorphous or relatively amorphous segments (soft segments), most preferably from 30 to 70 weight percent crystalline or relatively hard segments and 70 to 30 weight percent amorphous or relatively amorphous segments (soft segments). Within the soft segments, the mole percent comonomer may range from 10 to 90 mole percent, preferably from 20 to 80 mole percent, and most preferably from 33 to 75 mol % percent. In the case wherein the comonomer is ethylene, it is preferably present in an amount of 10 mol % to 90 mol %, more preferably from 20 mol % to 80 mol %, and most preferably from 33 mol % to 75 mol % percent. Preferably, the copolymers comprise hard segments that are 90 mol % to 100 mol % propylene. The hard segments can be greater than 90 mol % preferably greater than 93 mol % and more preferably greater than 95 mol % propylene, and most preferably greater than 98 mol % propylene. Such hard segments have corresponding melting points that are 80° C. and above, preferably 100° C. and above, more preferably 115° C. and above, and most preferably 120° C. and above.

The CBCs preferably have a Tm greater than 100° C., preferably greater than 120° C., and more preferably greater than 125° C. Preferably the MFR of the block composite is from 0.1 to 1000 dg/min, more preferably from 0.1 to 50 dg/min and more preferably from 0.1 to 30 dg/min.

Preferably, the block composite polymers comprise ethylene, propylene, 1-butene or 4-methyl-1-pentene and optionally one or more comonomers in polymerized form. Preferably, the block copolymers of the crystalline block composites comprise in polymerized form ethylene, propylene, 1-butene, or 4-methyl-1-pentene and optionally one or more $C_{4-20}$ α-olefin comonomers. Additional suitable comonomers are selected from diolefins, cyclic olefins, and cyclic diolefins, halogenated vinyl compounds, and vinylidene aromatic compounds.

Comonomer content in the resulting block composite polymers may be measured using any suitable technique, with techniques based on nuclear magnetic resonance (NMR) spectroscopy preferred.

Preferably the crystalline block composite polymers of the invention comprise from 0.5 to 95 wt % CEP, from 0.5 to 95 wt % CAOP and from 5 to 99 wt % block copolymer. More preferably, the crystalline block composite polymers comprise from 0.5 to 79 wt % CEP, from 0.5 to 79 wt % CAOP and from 20 to 99 wt % block copolymer and more preferably from 0.5 to 49 wt % CEP, from 0.5 to 49 wt % CAOP and from 50 to 99 wt % block copolymer. Weight percents are based on total weight of crystalline block composite. The sum of the weight percents of CEP, CAOP and block copolymer equals 100%.

Preferably, the block copolymers of the CBC comprise from 5 to 95 weight percent crystalline ethylene blocks (CEB) and 95 to 5 wt percent crystalline alpha-olefin blocks (CAOB). They may comprise 10 wt % to 90 wt % CEB and 90 wt % to 10 wt % CAOB. More preferably, the block copolymers comprise 25 to 75 wt % CEB and 75 to 25 wt % CAOB, and even more preferably they comprise 30 to 70 wt % CEB and 70 to 30 wt % CAOB.

In some embodiments, the block composites of the invention have a Crystalline Block Composite Index (CBCI), as defined below, that is greater than zero but less than 0.4 or from 0.1 to 0.3. In other embodiments, CBCI is greater than 0.4 and up to 1.0. In some embodiments, the CBCI is in the range of from 0.1 to 0.9, from 0.1 to 0.8, from 0.1 to 0.7 or from 0.1 to 0.6. Additionally, the CBCI can be in the range of from 0.4 to 0.7, from 0.5 to 0.7, or from 0.6 to 0.9. In some embodiments, CBCI is in the range of from 0.3 to 0.9, from 0.3 to 0.8, or from 0.3 to 0.7, from 0.3 to 0.6, from 0.3 to 0.5, or from 0.3 to 0.4. In other embodiments, CBCI is in the range of from 0.4 to 1.0, from 0.5 to 1.0, or from 0.6 to 1.0, from 0.7 to 1.0, from 0.8 to 1.0, or from 0.9 to 1.0.

Further preferably, the crystalline block composites of this embodiment of the invention have a weight average molecular weight (Mw) of 1,000 to 2,500,000, preferably of 35000 to 1,000,000 and more preferably of 50,000 to 500,000, of 50,000 to 300,000, and preferably from 50,000 to 200,000.

The overall composition of each resin is determined as appropriate by DSC, NMR, Gel Permeation Chromatography, Dynamic Mechanical Spectroscopy, and/or Transmission Electron Micrography. Xylene fractionation and high temperature liquid chromatography ("HTLC") fractionation can be further used to estimate the yield of block copolymer, and in particular the block composite index. These are described in more detail in US Patent Application Publication Nos US2011-0082257, US2011-0082258 and US2011-0082249, all published on Apr. 7, 2011 and incorporated herein by reference with respect to descriptions of the analysis methods.

Crystalline block composites having CAOP and CAOB composed of crystalline polypropylene and a CEP and CEB composed of crystalline polyethylene cannot be fractionated by conventional means. Techniques based on solvent or temperature fractionation, for example, using xylene fractionation, solvent/non-solvent separation, temperature rising elution fractionation, or crystallization elution fractionation are not capable of resolving the block copolymer since the CEB and CAOB cocrystallize with the CEP and CAOP, respectively. However, using a method such as high temperature liquid chromatography which separates polymer chains using a combination of a mixed solvent/non-solvent and a graphitic column, crystalline polymer species such as polypropylene and polyethylene can be separated from each other and from the block copolymer.

For crystalline block composites, the amount of isolated PP is less than if the polymer was a simple blend of iPP homopolymer (in this example the CAOP) and polyethylene (in this case the CEP). Consequently, the polyethylene fraction contains an appreciable amount of propylene that would not otherwise be present if the polymer was simply a blend of iPP and polyethylene. To account for this "extra propylene", a mass balance calculation can be performed to estimate a crystalline block composite index from the amount of the polypropylene and polyethylene fractions and the weight % propylene present in each of the fractions that are separated by HTLC. The polymers contained within the crystalline block composite include iPP-PE diblock, unbound iPP, and unbound PE where the individual PP or PE components can contain a minor amount of ethylene or propylene respectively.

A summation of the weight % propylene from each component in the polymer according to equation 1 results in the overall weight % propylene (of the whole polymer). This mass balance equation can be used to quantify the amount of the iPP and PE present in the diblock copolymer. This mass balance equation can also be used to quantify the amount of iPP and PE in a binary blend or extended to a ternary, or n-component blend. For the crystalline block composite, the overall amount of iPP or PE is contained within the blocks present in the diblock and the unbound iPP and PE polymers.

$$\text{Wt \% } C3_{Overall} = w_{PP}(\text{wt \% } C3_{PP}) + w_{PE}(\text{wt \% } C3_{PE}) \qquad \text{Eq. 1}$$

where
$w_{pp}$=weight fraction of PP in the polymer
$w_{pE}$=weight fraction of PE in the polymer
wt % $C3_{PP}$=weight percent of propylene in PP component or block
wt % $C3_{PE}$=weight percent of propylene in PE component or block Note that the overall weight % of propylene (C3) is preferably measured from C13 NMR or some other composition measurement that represents the total amount of C3 present in the whole polymer. The weight % propylene in the iPP block (wt % $C3_{PP}$) is set to 100 or if otherwise known from its DSC melting point, NMR measurement, or other composition estimate, that value can be put into its place. Similarly, the weight % propylene in the PE block (wt % $C3_{PE}$) is set to 100 or if otherwise known from its DSC melting point, NMR measurement, or other composition estimate, that value can be put into its place.

Based on equation 1, the overall weight fraction of PP present in the polymer can be calculated using Equation 2 from the mass balance of the total C3 measured in the polymer. Alternatively, it could also be estimated from a mass balance of the monomer and comonomer consumption during the polymerization. Overall, this represents the amount of PP and PE present in the polymer regardless of whether it is present in the unbound components or in the diblock copolymer. For a conventional blend, the weight fraction of PP and weight fraction of PE corresponds to the individual amount of PP and PE polymer present. For the crystalline block composite, it is assumed that the ratio of the weight fraction of PP to PE also corresponds to the average block ratio between PP and PE present in this statistical block copolymer.

$$w_{PP} = \frac{wt\% \ C3_{Overall} - wt\%C3_{PE}}{wt\% \ C3_{PP} - wt\%C3_{PE}} \qquad \text{Eq. 2}$$

where
$w_{PP}$=weight fraction of PP present in the whole polymer
wt % $C3_{PP}$=weight percent of propylene in PP component or block
wt % $C3_{PE}$=weight percent of propylene in PE component or block Applying equations 3 through 5, the amount of the isolated PP that is measured by HTLC analysis is used to determine the amount of polypropylene present in the diblock copolymer. The amount isolated or separated first in the HTLC analysis represents the unbound PP' and its composition is representative of the PP hard block present in the diblock copolymer. By substituting the overall weight % C3 of the whole polymer in the left hand side of equation 3, and the weight fraction of PP (isolated from HTLC) and the weight fraction of PE (separated by HTLC) into the right hand side of equation 3, the weight % of C3 in the PE fraction can be calculated using equations 4 and 5. The PE fraction is described as the fraction separated from the unbound PP and contains the diblock and unbound PE. The composition of the isolated PP is assumed to be the same as the weight % propylene in the iPP block as described previously.

$$wt\% \ C3_{Overall} = w_{PPisolated}(wt\%C3_{PP}) + w_{PE-fraction}(wt\%C3_{PE-fraction}) \qquad \text{Eq. 3}$$

$$wt\%C3_{PE-fraction} = \frac{wt\%C3_{Overall} - w_{PPisolated}(wt\%C3_{PP})}{w_{PP-fraction}} \qquad \text{Eq. 4}$$

$$w_{PE-fraction} = 1 - w_{PPisolated} \qquad \text{Eq. 5}$$

where
$w_{PPisolated}$=weight fraction of isolated PP from HTLC
$w_{PE-fraction}$=weight fraction of PE separated from HTLC, containing the diblock and unbound PE
wt % $C3_{PP}$=weight % of propylene in the PP; which is also the same amount of propylene present in the PP block and in the unbound PP
wt % $C3_{PE-fraction}$=weight % of propylene in the PE-fraction that was separated by HTLC
wt % $C3_{Overall}$=overall weight % propylene in the whole polymer The amount of wt % C3 in the polyethylene fraction from HTLC represents the amount of propylene present in the block copolymer fraction that is above the amount present in the 'unbound polyethylene'.

To account for the 'additional' propylene present in the polyethylene fraction, the only way to have PP present in this fraction, is that the PP polymer chain must be connected to a PE polymer chain (or else it would have been isolated with the PP fraction separated by HTLC). Thus, the PP block remains adsorbed with the PE block until the PE fraction is separated.

The amount of PP present in the diblock is calculated using Equation 6.

$$w_{PP-diblock} = \frac{wt\%C3_{PE-fraction} - wt\%C3_{PE}}{wt\%\ C3_{PP} - wt\%C3_{PE}} \quad \text{Eq. 6}$$

Where wt % $C3_{PE-fraction}$=weight % of propylene in the PE-fraction that was separated by HTLC (Equation 4)

wt % $C3_{PP}$=weight % of propylene in the PP component or block (defined previously)

wt % $C3_{PE}$=weight % of propylene in the PE component or block (defined previously)

$w_{PP-diblock}$=weight fraction of PP in the diblock separated with PE-fraction by HTLC The amount of the diblock present in this PE fraction can be estimated by assuming that the ratio of the PP block to PE block is the same as the overall ratio of PP to PE present in the whole polymer. For example, if the overall ratio of PP to PE is 1:1 in the whole polymer, then it assumed that the ratio of PP to PE in the diblock is also 1:1. Thus the weight fraction of diblock present in the PE fraction would be weight fraction of PP in the diblock ($w_{PP-diblock}$) multiplied by two. Another way to calculate this is by dividing the weight fraction of PP in the diblock ($w_{PP-diblock}$) by the weight fraction of PP in the whole polymer (equation 2).

To further estimate the amount of diblock present in the whole polymer, the estimated amount of diblock in the PE fraction is multiplied by the weight fraction of the PE fraction measured from HTLC.

To estimate the crystalline block composite index, the amount of block copolymer is determined by equation 7. To estimate the CBCI, the weight fraction of diblock in the PE fraction calculated using equation 6 is divided by the overall weight fraction of PP (as calculated in equation 2) and then multiplied by the weight fraction of the PE fraction. The value of the CBCI can range from 0 to 1, wherein 1 would be equal to 100% diblock and zero would be for a material such as a traditional blend or random copolymer.

$$CBCI = \frac{w_{PP-diblock}}{w_{PP}} \cdot w_{PE-fraction} \quad \text{Eq. 7}$$

Where $w_{PP-diblock}$=weight fraction of PP in the diblock separated with the PE-fraction by HTLC (Equation 6)

$w_{PP}$=weight fraction of PP in the polymer $w_{PE-fraction}$=weight fraction of PE separated from HTLC, containing the diblock and unbound PE (Equation 5)

For example, if an iPP-PE polymer contains a total of 62.5 wt % C3 and is made under the conditions to produce an PE polymer with 10 wt % C3 and an iPP polymer containing 97.5 wt % C3, the weight fractions of PE and PP are 0.400 and 0.600, respectively (as calculated using Equation 2). Since the percent of PE is 40.0 wt % and the iPP is 60.0 wt %, the relative ratio of the PE:PP blocks is expressed as 1:1.5.

Hence, if one skilled in the art, carries out an HTLC separation of the polymer and isolates 28 wt % PP and 72 wt % of the PE fraction, this would lead to the conclusion that a fraction of block copolymer was present. If the C3 content of the PE fraction (wt % $C_{3PE-fraction}$) is subsequently calculated to be 48.9 wt % C3 from equations 4 and 5, the PE fraction containing the additional propylene has 0.556 wt fraction of PE polymer and 0.444 weight fraction of PP polymer ($w_{PP-diblock}$, calculated using Equation 6).

Since the PE fraction contains 0.444 weight fraction of PP, it should be attached to an additional 0.293 weight fraction of PE polymer based on the iPP:PE block ratio of 1.5:1. Thus, the weight fraction of diblock present in the PE fraction is 0.741; further calculation of the weight fraction of diblock present in the whole polymer is 0.533. For the entire polymer, the composition is described as 53.3 wt % iPP-PE diblock, 28 wt % PP polymer, and 18.7 wt % PE polymer. The crystalline block composite index (CBCI) is the estimated weight fraction of diblock present in the whole polymer. For the example described above, the CBCI for the crystalline block composite is 0.533.

The Crystalline Block Composite Index (CBCI) provides an estimate of the quantity of block copolymer within the crystalline block composite under the assumption that the ratio of CEB to CAOB within the diblock is the same as the ratio of crystalline ethylene to crystalline alpha-olefin in the overall crystalline block composite. This assumption is valid for these statistical olefin block copolymers based on the understanding of the individual catalyst kinetics and the polymerization mechanism for the formation of the diblocks via chain shuttling catalysis as described in the specification.

The calculation of CBCI is based on the analytical observation that the amount of free CAOP is lower than the total amount of CAOP that was produced in the polymerization. The remainder of the CAOP is bound to CEB to form the diblock copolymer. Because the PE fraction separated by HTLC contains both the CEP and the diblock polymer, the observed amount of propylene for this fraction is above that of the CEP. This difference can be used to calculate the CBCI.

Based solely on the analytical observations without prior knowledge of the polymerization statistics, the minimum and maximum quantities of block copolymer present in a polymer can be calculated, thus distinguishing a crystalline block composite from a simple copolymer or copolymer blend.

The upper bound on the amount of block copolymer present within a crystalline block composite, $w_{DB_{Max}}$, is obtained by subtracting the fraction of unbound PP measured by HTLC from one as in Equation 8. This maximum assumes that the PE fraction from HTLC is entirely diblock and that all crystalline ethylene is bound to crystalline PP with no unbound PE. The only material in the CB C that is not diblock is that portion of PP separated via HTLC.

$$w_{DB_{Max}} = 1 - w_{PP_{isolated}} \quad \text{Eq. 8}$$

The lower bound on the amount of block copolymer present within a crystalline block composite, $w_{DB_{Min}}$, corresponds to the situation where little to no PE is bound to PP. This lower limit is obtained by subtracting the amount of unbound PP as measured by HTLC from the total amount of PP in the sample as shown in Equation 9.

$$w_{DB_{Min}} = w_{PP} - w_{PP_{isolated}} \quad \text{Eq. 9}$$

Furthermore, the crystalline block composite index will fall between these two values: $w_{DB_{Min}} \leq CBCI \leq w_{DB_{Max}}$.

Based on the polymerization mechanism for production of the crystalline block composites, the CBCI represents the best estimate of the actual fraction of diblock copolymer in the composite. For unknown polymer samples, $w_{DB_{Min}}$ can be used to determine if a material is a crystalline block composite. For a physical blend of PE and PP, the overall weight fraction of PP should be equal to that of the wt % PP from HTLC and the lower bound on diblock content, Equation 9, is zero. If this analysis is applied to a sample of PP that does not contain PE both the weight fraction of PP and amount of PP obtained from HTLC are 100% and again the lower bound on diblock content, Equation 9, is zero. Finally if this analysis is applied to a sample of PE that does not contain PP then both the weight fraction of PP and weight fraction PP recovered via HTLC are zero and the lower bound on diblock, Equation 9, is zero. Because the lower bound on diblock content is not greater than zero in any of these three cases, these materials are not crystalline block composites.

Differential Scanning Calorimetry (DSC)

Differential Scanning calorimetry is used to measure, among other things, the heats of fusion of the crystalline block and block composites and is performed on a TA Instruments Q1000 DSC equipped with an RCS cooling accessory and an auto sampler. A nitrogen purge gas flow of 50 ml/min is used. The sample is pressed into a thin film and melted in the press at about 190° C. and then air-cooled to room temperature (25° C.). About 3-10 mg of material is then cut, accurately weighed, and placed in a light aluminum pan (ca 50 mg) which is later crimped shut. The thermal behavior of the sample is investigated with the following temperature profile: the sample is rapidly heated to 190° C. and held isothermal for 3 minutes in order to remove any previous thermal history. The sample is then cooled to −90° C. at 10° C./min cooling rate and held at −90° C. for 3 minutes. The sample is then heated to 190° C. at 10° C./min heating rate. The cooling and second heating curves are recorded. For the heat of fusion measurements for the CBC and specified BC resins, as known and routinely performed by skilled practitioners in this area, the baseline for the calculation is drawn from the flat initial section prior to the onset of melting (typically in the range of from about −10 to about 20° C. for these types of materials) and extends to the end of melting for the second heating curve.

Another suitable resin(s) that may be used in Layer B is a block composite comprising:
  i) an ethylene polymer comprising at least 80 mol % polymerized ethylene, preferably at least 85 mol %, more preferably at least 90 mol %, and most preferably at least 93 mol % polymerized ethylene;
  ii) an alpha-olefin-based crystalline polymer (CAOP) and
  iii) a block copolymer comprising (a) an ethylene polymer block comprising at least 80 mol % polymerized ethylene, preferably at least 85 mol %, more preferably at least 90 mol %, and most preferably at least 93 mol % polymerized ethylene and (b) a crystalline alpha-olefin block (CAOB).

Preferred suitable CBC resin(s) for Layer B have a CAOB amount (in part (iii)) in the range of from 30 to 70 weight % (based on (iii)), preferably at least 40 wt %, more preferably at least 45 wt % and most preferably 50 wt %, and preferably up to 60 wt %, and preferably up to 55 wt % (the balance in each case being ethylene polymer). It has also been found that the CBC resin(s) suitable for Layer B have a (crystalline) block composite index of at least 0.1, preferably at least 0.3, preferably at least 0.5 and more preferably at least 0.7. Another way to characterize the suitable CBC resin(s) essential for Layer B is as having a MFR in the range of from 1 to 50 dg/min; preferably at least 2, more preferably at least 3; and preferably up to 40, and preferably up to 30 g/min.

In general, CBCs that can be used in Layer B according to the present invention will have heat of fusion values (reflecting the relatively higher ethylene content in the CEP and CEB) as measured by DSC of at least 85 Joules per gram (J/g), more preferably at least 90 J/g. In either case, the heat of fusion values for polymers of these types would generally have a maximum in the area of 125 J/g. For the heat of fusion measurements, as generally known and performed by practitioners in this area, the DSC is run as generally described below under nitrogen at 10° C./min from 23° C. to 220° C., held isothermal at 220° C., dropped to 23° C. at 10° C./min and ramped back to 220° C. at 10° C./min. The second heat data is used to calculate the heat of fusion of the melting transition.

MAH-m-polyolefins are another preferred seal layer material and include MAH-g-polyolefins and MAH interpolymers, i.e., the MAH functionality is present in the polyolefin either by grafting onto the polymer backbone or incorporating the functionality into the backbone through copolymerization of MAH with the olefin monomer.

The unsaturated organic compound content of the graft polyolefin is at least 0.01 wt %, and preferably at least 0.05 wt %, based on the combined weight of the polyolefin and the organic compound. The maximum amount of unsaturated organic compound content can vary to convenience, but typically it does not exceed 10 wt %, preferably it does not exceed 5 wt %, and more preferably it does not exceed 2 wt %. This unsaturated organic content of the graft polyolefin is measured by a titration method, e.g., a grafted polyolefin/xylene solution is titrated with a potassium hydroxide (KOH) solution. The MAH functionality can be present in the polyolefin e.g., by grafting, or even by copolymerization with the olefin monomer.

The unsaturated organic compound can be grafted to the polyolefin by any known technique, such as those taught in U.S. Pat. Nos. 3,236,917 and 5,194,509. For example, in the '917 patent the polymer is introduced into a two-roll mixer and mixed at a temperature of 60° C. The unsaturated organic compound is then added along with a free radical initiator, such as, for example, benzoyl peroxide, and the components are mixed at 30° C. until the grafting is completed. In the '509 patent, the procedure is similar except that the reaction temperature is higher, e.g., 210 to 300° C., and a free radical initiator is not used or is used at a reduced concentration.

An alternative and preferred method of grafting is taught in U.S. Pat. No. 4,950,541 by using a twin-screw devolatilizing extruder as the mixing apparatus. The polymer and unsaturated organic compound are mixed and reacted within the extruder at temperatures at which the reactants are molten and in the presence of a free radical initiator. Preferably, the unsaturated organic compound is injected into a zone maintained under pressure within the extruder.

In describing the use of the polymer components above to make laminate or layered structures, there are a number of terms that are regularly used and defined as follows.

"Layer" means a single thickness, coating or stratum continuously or discontinuously spread out or covering a surface.

"Multi-layer" means at least two layers.

"Facial surface", "planar surface" and like terms as related to films or layers mean the surfaces of the layers that are in contact with the opposite and adjacent surfaces of the adjoining layers. Facial surfaces are in distinction to edge surfaces. A rectangular film or layer comprises two facial surfaces and four edge surfaces. A circular layer comprises two facial surfaces and one continuous edge surface.

"In adhering contact" and like terms mean that one facial surface of one layer and one facial surface of another layer are in touching and binding contact to one another such that one layer cannot be removed for the other layer without damage to the in-contact facial surfaces of both layers.

"Sealing relationship" and like terms mean that two or more components, e.g., two polymer layers, or a polymer layer and an electronic device, or a polymer layer and a glass cover sheet, etc., join with one another in such a manner, e.g., co-extrusion, lamination, coating, etc., that the interface formed by their joining is separated from their immediate external environment.

Depending upon their intended use, the multilayer film or sheet structures according to the present invention can be designed to meet certain performance requirements such as in the areas of physical performance properties including toughness, transparency, tensile strength, interlayer adhesion, and heat resistance.

In some embodiments, the total structure thickness can range from 25 microns-2.5 cm or preferably, 50 microns to 1 mm. In some embodiments, Layer B is 4 microns to 50 microns in thickness.

In addition to multi-layer film structures, the invention also comprises any multilayer structure including injection molded and blow molded containers and bottles, pipe, tubing, wire and cable and films and sheeting including laminates. Examples of structures comprise those disclosed in, for example, CA 2 735 182, US Patent Application Publication No. 2003/0215655, US2004/0241360, and US2007/0160788. These structures include rigid blow molded articles, multilayer film structures having annular profiles, and coextruded blow molded articles.

EXAMPLES

Experimental multilayer sample films (layers indicated by letters, e.g., A, B, and C), as summarized below in the Tables below, are made using the thermoplastic resin materials summarized below in Table 1. Where indicated, the Melt Flow Rates (MFR) are measured according to ASTM D1238 (230 C/2.16 kg) and reported in grams per 10 minutes (g/10 min) and Melt Index values (MI) are measured according to ASTM D1238 (190 C/2.16 kg) and reported in g/10 min.

The density is measured according to ASTM D792 and given in grams per cubic centimeter (g/cc).

Retort Process

The retort treatment is carried out in a Contexxor yarn steamer. The films are cut in 200×15 mm in the machine direction and sealed at constant sealing bars at 150° C. for 1 sec. Four seals are made and the bags are kept empty. Empty bags are sterilized in the steamer at 122° C. for 40 min Adhesion Testing For adhesion testing, the films are sealed along the cross direction at 150° C. for 1 sec. Strips of 15 mm wide by 100 mm long are cut from the sealed area. Adhesion is measured along the machine direction. Delamination is initiated by carefully opening the seal. The specimens are peeled at 125 mm min$^{-1}$ at ambient temperature INSTRON 5564 Dynomometer. At least 5 specimens are tested and average of the peak load is reported.

Haze Testing

The film haze is measured based on ISO 14782 standard method. The adhesion and haze are measured both before and after the retort treatment.

Heat Seal Strength Testing

Heat seal strength testing is based upon ASTM Standard Test Method F88, STM for Seal Strength of Flexible Barrier Materials. It measures the force required to separate a test strip of material containing the seal. It also identifies the mode of specimen failure. Specimens are die cut strips that are 15 mm in width. The test result is a measure of the force required to pull apart the heat seal, or the force required to break the film in cases where the film breaks before the heat seal parts.

Optical Microscopy

For sample preparation, optical sections of approximately, 5 microns thick were collected at −120° C. using a diamond knife on a Leica UCT microtome equipped with an FCS cryo-sectioning chamber. The sections were transferred to a microscope slide containing a drop of Dow Corning E-200 silicon oil and covered with a cover glass prior to analysis. Transmitted bright field light under differential interference contrast illumination was used to view the optical sections using a Carl Zeiss Axiolmager Zlm compound microscope and images were acquired with the aid of a HRc digital camera.

Materials

TABLE 1

Description of materials

| Material | Description |
|---|---|
| CBC1 | 50/50 EP/iPP, 90 wt % C2 in EP, 3.6 MFR (g/10 min at 230° C./2.16 Kg) |
| CBC2 | 50/50 EP/iPP, 90 wt % C2 in EP, 7.0 MFR |
| CBC3 | 50/50 EP/iPP, 90 wt % C2 in EP, 6.3 MFR |
| CBC4 | 50/50 EP/iPP, 90 wt % C2 in EP, 8.5 MFR |
| MAHPECONC1 | AMPLIFY TY1053H, MAH-g-HDPE, 0.965 g/cm$^3$, 2MI (g/10 min at 190° C./2.16 Kg), 1.2 wt % MAH, The Dow Chemical Company |
| PP H357-09R | Polypropylene homopolymer, 9.5 MFR, Braskem |
| AFFINITY EG 8200 | Polyolefin elastomer, 0.870 g/cm$^3$, 5.0 MI, The Dow Chemical Company |
| AFFINITY PL1850 | Polyolefin plastomer, 0.900 g/cm$^3$, 3.0 MI, The Dow Chemical Company |
| HDPE KS10100 | HDPE, 0.953 g/cm$^3$, 4.0 MI, The Dow Chemical Company |
| MAHPECONC2 | MAH-g-HDPE, 0.960 g/cm$^3$, 6.0 MI, 2.0 wt % MAH, The Dow Chemical Company |
| MAHPPCONC | MAH-g-PP, 500 MI, 0.7 wt % MAH, The Dow Chemical Company |
| ELITE 5100G | LLDPE, 0.920 g/cm$^3$, 0.85 MI, The Dow Chemical |

TABLE 1-continued

Description of materials

| Material | Description |
|---|---|
| ELITE 5940G | Company<br>MDPE, 0.940 g/cm³, 0.85 MI, The Dow Chemical Company |
| ENGAGE 8150 | Polyolefin elastomer, 0.870 g/cm³, 0.5 MI, The Dow Chemical Company |
| INFUSE OBC 9500 | Olefin block copolymer, Density = 0.877 g/cc, 5.0 MI, The Dow Chemical Company |
| AMPLIFY TY 2551 | Formulated PP based tie resins, 5.0 MFR, The Dow Chemical Company |
| PPTIE1 | Formulated PP based tie resins, 5.5 MFR, 0.14 wt % MAH grafting level, The Dow Chemical Company |
| ADMER QF551 | Formulated PP based tie resins, 5.2 MFR, Mitsui Chemicals |
| PP R7051-10N | Polypropylene random copolymer, 10 MFR, Braskem |
| PP R35208-R | Polypropylene random copolymer, 8 MFR, Braskem |
| Polyamide UBE 5033B | Polyamide 6/66 Copolymer, UBE Engineering Plastics, S.A. |
| PP 6D83K | Polypropylene random copolymer, 1.9 MFR, Braskem |
| Polyamide Ultramid™ C33L01 | Polyamide 66/6 Copolymer, BASF |
| Polyamide Ultramid™ B36 01 | Polyamide 6, BASF |
| EVOH EVAL™ H171B | EVOH with 38 mol % Ethylene, Kuraray Co., Ltd. |
| EVOH EVAL™ LR171B | EVOH with 27 mol % Ethylene, Kuraray Co., Ltd. |
| PP H110-02N | Polypropylene homopolymer, 2.0 MFR, Braskem |
| Polyamide Ultramid™ C40LN07 | Polyamide 66/6 Copolymer, BASF |
| EVOH EVAL™ F171B | EVOH with 32 mol % Ethylene, Kuraray Co., Ltd. |
| DOWLEX 2045G | LLDPE, 0.920 g/cm3, 1 MI, The Dow Chemical Company |
| AMPLIFY TY 1353 | Formulated PE based tie resin, 2 MI, The Dow Chemical Company |
| AMPLIFY TY 1228B | Formulated PE based tie resin, 2.3 MI, The Dow Chemical Company |
| Irganox B225 | BASF |
| Irganox B215 | BASF |

Synthesis of Crystalline Block Composites

General

Catalyst-1 ([[rel-2',2'''-[(1R,2R)-1,2-cylcohexanediylbis(methyleneoxy-κO)]bis[3-(9H-carbazol-9-yl)-5-methyl[1,1'-biphenyl]-2-olato-κO]](2-)]dimethyl-hafnium) and cocatalyst-1, a mixture of methyldi($C_{14-18}$alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,983, Ex. 2., are purchased from Boulder Scientific and used without further purification.

CSA-1 (diethylzinc or DEZ) and cocatalyst-2 (modified methylalumoxane (MMAO)) were purchased from Akzo Nobel and used without further purification. The solvent for the polymerization reactions is a hydrocarbon mixture (ISOPAR®E) obtainable from ExxonMobil Chemical Company and purified through beds of 13-X molecular sieves prior to use.

The crystalline block composites of the present Examples are designated CBC1-CBC4. They are prepared using two continuous stirred tank reactors (CSTR) connected in series. The first reactor was approximately 12 gallons in volume while the second reactor was approximately 26 gallons. Each reactor is hydraulically full and set to operate at steady state conditions. Monomers, solvent, hydrogen, catalyst-1, cocatalyst-1, cocatalyst-2 and CSA-1 are fed to the first reactor according to the process conditions outlined in Table 2. The first reactor contents as described in Table 2 flow to a second reactor in series. Additional monomers, solvent, hydrogen, catalyst-1, cocatalyst-1, and optionally, cocatalyst-2, are added to the second reactor. Table 3 shows the analytical characteristics of CBC1-CBC4.

TABLE 2

Reactor process conditions to produce crystalline block composites

| | CBC1 | | CBC2 | | CBC3 | | CBC4 | |
|---|---|---|---|---|---|---|---|---|
| Reactor | 1st Reactor | 2nd Reactor | 1st Reactor | 2nd Reactor | 1st Reactor | 2nd Reactor | 1st Reactor | 2nd Reactor |
| Reactor Control Temp. (° C.) | 118 | 110 | 140 | 135 | 141 | 135 | 153 | 130 |
| Solvent | 145 | 145 | 212 | 245 | 242 | 245 | 343 | 101 |

TABLE 2-continued

Reactor process conditions to produce crystalline block composites

| Reactor | CBC1 1st Reactor | CBC1 $2^{nd}$ Reactor | CBC2 1st Reactor | CBC2 2nd Reactor | CBC3 1st Reactor | CBC3 2nd Reactor | CBC4 1st Reactor | CBC4 2nd Reactor |
|---|---|---|---|---|---|---|---|---|
| Feed (lb/hr) Propylene | 1.98 | 31.03 | 5.46 | 49.3 | 5.44 | 48.76 | 3.4 | 44.1 |
| Feed (lb/hr) Ethylene | 27.8 | 0.0 | 47.1 | 0.0 | 47.0 | 0.0 | 41.7 | 0 |
| Feed (lb/hr) Hydrogen Feed SCCM) | 9.6 | 9.2 | 9.6 | 9.9 | 9.5 | 0.0 | 0 | 0 |
| Reactor Ethylene Conc. (g/L) | 3.25 | — | 3.84 | — | 4.41 | — | 2.06 | — |
| Reactor Propylene Conc. (g/L) | — | 2.00 | — | 2.00 | — | 2.26 | — | 2.42 |
| Catalyst Efficiency (gPoly/gM) *1.0E6 | 5.166 | 0.167 | 0.86 | 0.025 | 0.706 | 0.075 | 0.247 | 0.138 |
| Catalyst Flow (lb/hr) | 1.16 | 0.95 | 1.96 | 2.14 | 0.47 | 1.78 | 0.31 | 0.53 |
| Catalyst Conc. (ppm) | 5 | 196 | 30 | 900 | 150 | 500 | 600 | 600 |
| Cocatalyst-1 Flow (lb/hr) | 1.48 | 0.93 | 1.47 | 2.16 | 1.41 | 1.12 | 0.62 | 0.53 |
| Cocatalyst-1 Conc. (ppm) | 50 | 2000 | 400 | 7500 | 500 | 8000 | 2729 | 7082 |
| Cocat.-2 Flow (lb/hr) | 0.91 | 0.00 | 0 | 0.30 | 1.18 | 0.75 | 0.72 | 0.73 |
| Cocat.-2 Conc. (ppm) | 1494 | 0 | 0 | 2686 | 1993 | 1993 | 3442 | 1893 |
| DEZ Flow (lb/hr) | 1.10 | 0.00 | 1.94 | 0 | 1.89 | 0 | 1.49 | 0 |
| DEZ Conc. (ppm) | 30000 | 0 | 30000 | 0 | 30000 | 0 | 30000 | 0 |

TABLE 3

Crystalline block composite physical properties

| Example | MFR (230° C./ 2.16 kg) | Wt % PP from HTLC Separation | Mw Kg/mol | Mw/Mn | Total Wt % $C_2$ | Tm (° C.) Peak 1 (Peak 2) | Tc (° C.) | Melt Enthalpy (J/g) |
|---|---|---|---|---|---|---|---|---|
| CBC1 | 3.6 | 13.2 | 146 | 2.8 | 46.7 | 130 (114) | 97 | 126 |
| CBC2 | 7.0 | 14.2 | 128 | 4.0 | 46.9 | 132 (108) | 91 | 97 |
| CBC3 | 7.5 | 19.4 | 109 | 2.8 | 48.3 | 129 (108) | 91 | 91 |
| CBC4 | 10.1 | 20.3 | 92 | 3.5 | 48.1 | 130 (105) | 90 | 103 |

Table 4 shows the ratio of iPP to EP as well as the estimated crystalline block composite index for CBC1-CBC4.

TABLE 4

Crystalline Block Composite Index Estimation

| Sample | wt % iPP | wt % EP | Wt % $C_2$ in EP | Crystalline Block Composite Index |
|---|---|---|---|---|
| CBC1 | 49 | 51 | 90 | 0.729 |
| CBC2 | 50 | 50 | 90 | 0.707 |
| CBC3 | 50 | 50 | 90 | 0.633 |
| CBC4 | 50 | 50 | 90 | 0.566 |

FIG. 1 shows the DSC profile for CBC1. The DSC profile shows a melting peak at 129° C. which is representative of the CAOP and CAOB and 113° C. which corresponds to the CEP and CEB. The observed melt enthalpy was 115 J/g and glass transition temperature was observed at −11° C.

Figure 2:
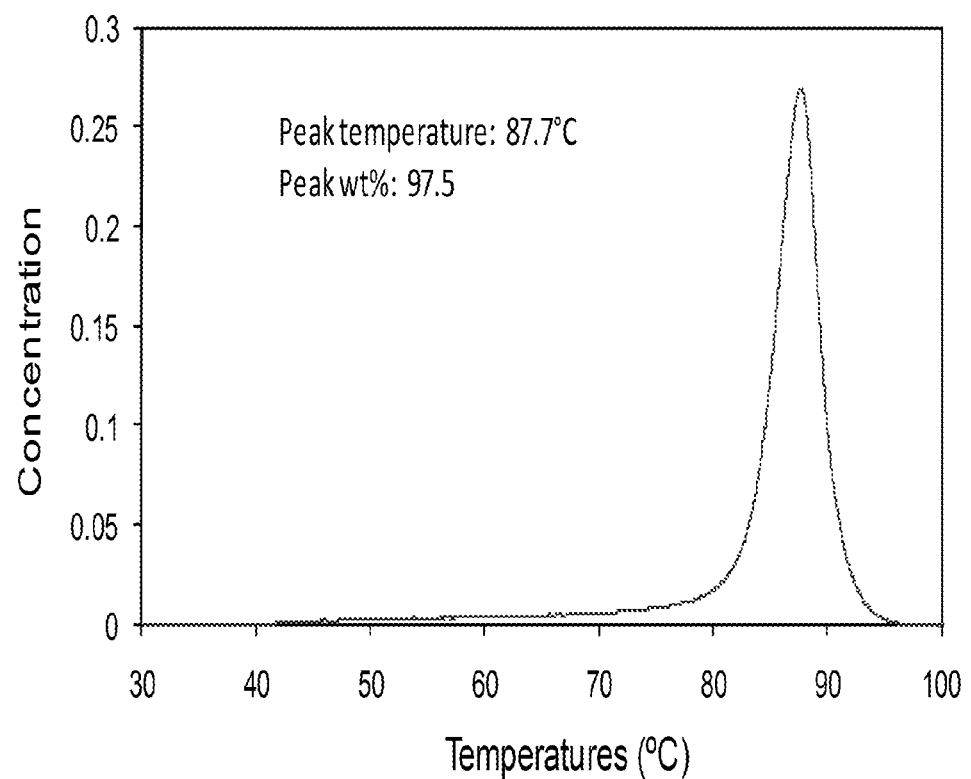
FIG. 2 shows TREF for CBC1.

FIG. 2 shows the TREF analysis of CBC1. The TREF elution profile shows that CBC1 is highly crystalline and in contrast to the DSC melting profile, shows little or no separation of the CEP and CAOP or the block copolymer. Only 2.4 wt % purge was measured which also indicates the very high crystallinity of components in CB C1.

Figure 3:
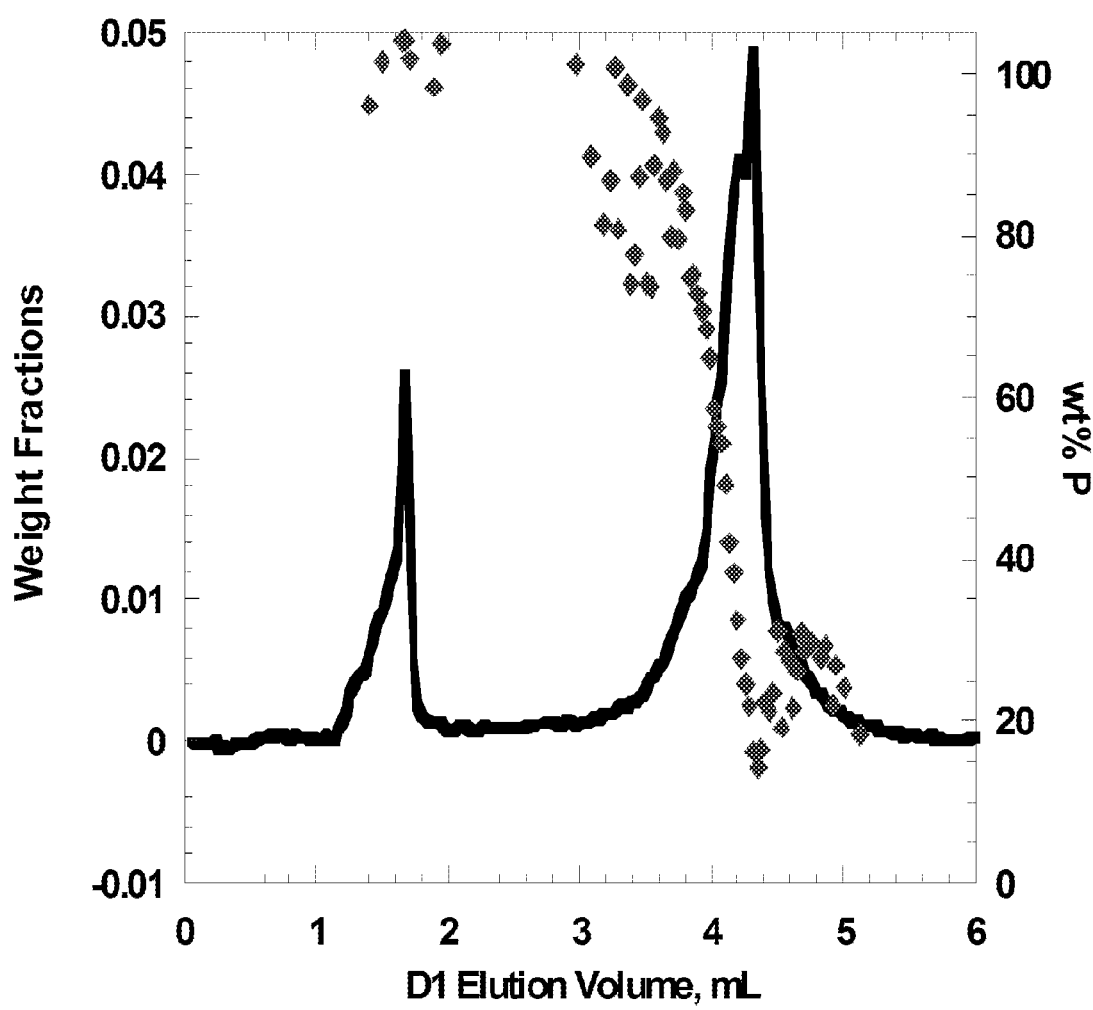
FIG. 3 shows HTLC for CBC1.

FIG. 3 shows HTLC analysis of CBC1. The elution profile of CBC1 by HTLC showed that 13.2 wt % of an early eluting peak between 1-2 mL and 86.8 wt % of a later eluting peak between 3-5 mL was eluted. From the concentration and composition measurement, it is determined that the early eluting peak was isolated PP which is CAOP and representative of the CAOB. This is shown by the composition profile of the wt % of C3 present. The second peak and later eluting peak is rich in C2 and shows a gradient of C3. It can be interpreted that this peak is the PE phase and contains the block copolymer and CEP. The composition gradient shows that the block copolymer is eluted earlier and the CEP is eluted last.

Cast Film Examples

Compounding of Tie Layer Formulations

The blends for tie layer formulations are compounded using a 30 mm TSE (a Leistritz machine). The extruder has five heated zones, a feed zone, and a 3 mm strand die. The feed zone is cooled by flowing water through its core, while the remaining zones 1-5 and die are heated electrically and controlled by air cooling to specified temperatures depending on the materials being blended. The following temperature settings are used in the extrusion process: Zones 1-5 are heated to 130, 186, 190, 190, and 190° C., and the die is heated to 190° C. The drive unit for the extruder is run at 150 rpm. The formulations for compounding are shown in Table 5.

TABLE 6

Extruder conditions for cast film

| Extruders | Zones | Temperature (° C.) | |
|---|---|---|---|
| #1 and #5 (for PP layer) | Zone 01 | Set point | 180 |
| | Zone 02 | Set point | 225 |
| | Zone 03 | Set point | 235 |
| | Zone 04 | Set point | 240 |
| | Melt-T | Actual | 228 |
| #2 and #4 (for tie layer) | Zone 01 | Set point | 180 |
| | Zone 02 | Set point | 225 |
| | Zone 03 | Set point | 235 |
| | Zone 04 | Set point | 240 |
| | Zone 05 | Set point | 240 |
| | Melt-T | Actual | 227 |
| #3 (for polyamide layer) | Zone 01 | Set point | 210 |
| | Zone 02 | Set point | 240 |
| | Zone 03 | Set point | 250 |
| | Zone 04 | Set point | 250 |
| | Zone 05 | Set point | 250 |
| | Melt-T | Actual | 243 |

TABLE 5

Tie layer formulations for the cast films

| Example | hPP H357-09R (%) | MAHPECONC1 (%) | CBC1 (%) | CBC2 (%) | AFFINITY EG 8200 (%) | AFFINITY PL1850 (%) | HDPE KS10100 (%) | Irganox B225 (%) |
|---|---|---|---|---|---|---|---|---|
| A | | 20 | | 0 | | 80 | | 0.2 |
| 1 | | 20 | 20 | | | 60 | | 0.2 |
| 2 | | 20 | | 20 | | 60 | | 0.2 |
| 3 | | 20 | | 30 | | 50 | | 0.2 |
| 4 | | 20 | | 40 | | 40 | | 0.2 |
| 5 | | 20 | | 50 | | 30 | | 0.2 |
| 6 | 25 | 20 | | 40 | | 15 | | 0.2 |
| 7 | | 20 | | 20 | 20 | | 40 | 0.2 |
| 8 | | 20 | | 40 | 20 | | 20 | 0.2 |

To compare with INFUSE OBC based tie layer formulation, INFUSE OBC 9500 (OBC) is blended with MAH grafted INFUSE OBC 9500 (MAH-g-OBC) or with MAH-PECONC1. To prepare MAH-g-OBC, a ZSK-92 Megacompounder with 11 barrels (45 L/D) is used. The OBC resin is fed with K-Tron T-60 feeder. MAH is injected at barrel 3, port 1 using a Lewa pump. The peroxide/oil mixture (50/50 wt/wt) was injected at barrel 3, port 2 using a Prominent Sigma plunger pump. The barrel temperature is set at 80° C. for zone 1 and 225° C. for zone 2 to 11. A vacuum pump system is used for devolatilization at barrel 9. The screw RPM is at 200 to 230, the torque ranges from 56% to 61%. The feed rate for OBC1 is set at 1500 lb/hr. The feed formulation is 1.70% MAH, 0.20% peroxide/mineral oil (50/50, wt/wt) mixture. The final MAH grafting level is 1.1% and melt index of MAH-g-OBC is 3.0 (2.16 kg, 190° C.). For the cast fabrication, the OBC is dried blended MAH-g-OBC or with MAHPECONC1.

Cast Film Process

Figure 4:
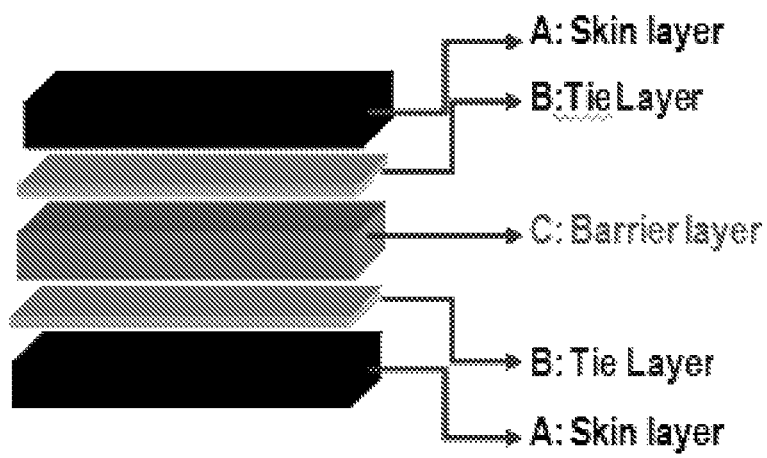
FIG. 4 shows a schematic for cast film structures.

Five layer films in an A/B/C/B/A structure (FIG. 4 Error! Reference source not found.) are extruded on the Collins 5-Layer Cast Line. The total film thickness is 150 um, in which A is the skin layer (40 um), B is the tie layer (10 um) and C is the barrier layer (50 um). Polyamide UBE 5033B is used as the barrier layer, and Dow PP R7051-10N (10 MFR) is used as skin layer. The line has 5 extruders. Extruders and 1 and 5 are used for skin layers, extruders 2 and 4 are used for tie layers and extruder 3 for barrier layer. The extruder temperature profiles are shown in Table 6.

The formulations for tie layers used for cast film are shown in Table 6. Ex. A1 and Ex. 1-5 contain polyolefin plastomer as represented by AFFINITY PL 1850. In these examples, the loading of MAH-g-HDPE (MAHPECONC1) is kept constant. Before retort process, Ex. A1 and Ex. 1-5 show excellent interlayer adhesion ranging from 13 to 15 N/15 mm After retort, however, the adhesion for Ex. A1 becomes poor. Adding 20% CBC1 (Ex. 1) to tie layer formulation significantly improves adhesion property after retort. In Ex. 2-5, the amount of CBC2 is increased from 20% to 50%. The adhesion value increases as the concentration of CBC2 increases. When CBC2 concentration in the tie layer formulation changes between 40% (Ex. 4) and 50% (Ex. 5), the adhesion value after retort is comparable to polypropylene based tie layer (Ex. B). Ex. 4 and 5 show good film smoothness after retort.

In Ex. 6, 25% polypropylene is added in addition to CBC2. An interlayer adhesion value of 6.1 N/15 mm is achieved after retort. In Ex. 7 and 8, polyolefin plastomer as represented by AFFINITY PL1850 is replaced with HDPE KS10100. With 40% CBC2 added to Ex. 8, an excellent adhesion value of 9.4 N/15 mm is achieved after retort. Ex. 8 shows good film smoothness after retort.

The comparative examples (A2 and A3) based on INFUSE OBC formulation show good adhesion before and after retort; however, the film has severe wrinkles as a result of shrinkage after retort. Ex A3 has high haze after retort as a result of melting and recrytallization during the retort process.

In terms of haze, Ex. 5 is better than the Ex. B whereas Ex. 8 is comparable to Ex. B.

H171B is used as barrier layer, the layer structure is A/B/C/B/A (35/10/10/10/35 um). The line has 5 extruders.

TABLE 7

Interlayer adhesion and haze results of the cast films (Skin layer being PP R7051-10N and core layer being Polyamide UBE 5033B)

| | Tie layer formulations | | | | | | | Adhesion | | | |
|---|---|---|---|---|---|---|---|---|---|---|---|
| | hPP | | | | AFFINITY | AFFINITY | HDPE | (N/15 mm) | | Haze (%) | |
| Example | H357-09R (%) | MAHPECONC1 (%) | CBC1 (%) | CBC2 (%) | EG 8200 (%) | PL1850 (%) | KS10100 (%) | Before retort | After retort | Before retort | After retort |
| A1 | | 20 | | 0 | | 80 | | 12.9 | 0.8 | 2.5 | 11.9 |
| 1 | | 20 | 20 | | | 60 | | 14.1 | 6.2 | 2.3 | 12.6 |
| 2 | | 20 | | 20 | | 60 | | 13.5 | 3.6 | 2.6 | 8.4 |
| 3 | | 20 | | 30 | | 50 | | 13.8 | 5.6 | 2.3 | 8.9 |
| 4 | | 20 | | 40 | | 40 | | 13.7 | 7.5 | 2.7 | 9.6 |
| 5 | | 20 | | 50 | | 30 | | 15.1 | 11.0 | 2.5 | 9.4 |
| 6 | 25 | 20 | | 40 | | 15 | | 4.1 | 6.1 | 2.7 | 13.1 |
| 7 | | 20 | | 20 | 20 | | 40 | 13.2 | 1.2 | 3.9 | 14.7 |
| 8 | | 20 | | 40 | 20 | | 20 | 14.0 | 9.4 | 3.4 | 13.9 |
| A2 | | 80% INFUSE OBC 9500 + 20% MAH-g-INFUSE | | | | | | 10.0 | 6.1 | 5.2 | 16.0 |
| A3* | | 80% INFUSE OBC 9500 + 20% MAHPECONC1 | | | | | | 10.1 | 7.8 | 12.3 | 47.1 |
| B | | ADMER QF 551 | | | | | | 14.2 | 9.6 | 3.3 | 13.8 |

*Skin layer is random copolymer PP R35208-R, 8 MFR

Blown Film Examples

Compounding of Tie Layer Formulations

The blends for tie layer formulations used for blown film trials are compounded on a Coperion ZSK 26 twin screw extruder. Screw diameter is 25.5 mm with a flight depth of 4.55 mm. The feed rate of 50 lbs/hr and screw RPM of 500 are used. Barrel length is 100 mm per with 15 barrels comprising the entire process section. The following temperature settings are used in the extrusion process: Zones 1-2 are heated to 140° C., and other zones and die are heated to 190° C. The compounded material was extruded thru a two hole die into a 16 foot long chilled water bath. The strands are then passed thru a Berlyn Air Knife to remove excess water. Once the strands are cooled and dried they are pelletized with a Lab Tech side cut pelletizer.

TABLE 8

Tie layer formulations for blown films

| Example | MAHPECONC1 | MAHPECONC2 | MAHPPCONC | CBC3 | ENGAGE 8150 | ELITE 5100G | ELITE 5940G | B225 |
|---|---|---|---|---|---|---|---|---|
| 9, 14 | 20 | 0 | 0 | 50 | 20 | 0 | 10 | 0.2 |
| 10 | 20 | 0 | 0 | 50 | 20 | 10 | 0 | 0.2 |
| 11, 15 | 20 | 0 | 0 | 60 | 20 | 0 | 0 | 0.2 |
| 12 | 0 | 12 | 0 | 60 | 20 | 0 | 8 | 0.2 |
| 13 | 0 | 0 | 20 | 60 | 20 | 0 | 0 | 0.2 |
| 16 | 20 | 0 | 0 | 80 | 0 | 0 | 0 | 0.2 |

Blown film process on Lab Tech Blown Film Line

Five layer films in an A/B/C/B/A structure Error! Reference source not found. are blown on a Lab Tech 5-Layer Blown Film Line. The diameter of the extrusion die is 75 mm and the die gap is 2 mm. The blow-up ratio (BUR) is 2.7 and lay flat width is 12.7 inch. The nip speed is 13.5 ft/min. The total film thickness is 100 um, in which A is the skin layer, B is the tie layer and C is the barrier layer. Dow PP 6D83K is used as skin layer. Both Polyamide and EVOH are used as the bather layer. When polyamide Ultramid™ C33L01 is used as barrier layer, the layer structure is A/B/C/B/A (30/10/20/10/30 um). When EVOH EVAL™

Extruders and 1 and 5 are used for skin layers, extruders 2 and 4 are used for tie layers and extruder 3 for barrier layer. The extruder temperature profiles are shown in Table 9 for samples with polyamide as barrier. The extruder temperature profiles are shown in Table 10 for samples with EVOH as barrier.

TABLE 9

Extruder conditions for Lab Tech Blown Film Line for samples with polyamide layer

| Extruders | Zones | Temperature | (° F.) | (° C.) |
|---|---|---|---|---|
| Extruders 1 and 5: PP (6D83K) | Zone 01 | Set point | 400 | 204 |
| | Zone 02 | Set point | 425 | 218 |
| | Zone 03 | Set point | 385 | 196 |
| | Zone 04 | Set point | 385 | 196 |
| | Die | Set point | 430 | 221 |

TABLE 9-continued

Extruder conditions for Lab Tech Blown Film Line for samples with polyamide layer

| Extruders | Zones | Temperature | (° F.) | (° C.) |
|---|---|---|---|---|
| Extruders 2 and 4: Tie | Zone 01 | Set point | 375 | 191 |
| | Zone 02 | Set point | 400 | 204 |
| | Zone 03 | Set point | 385 | 196 |
| | Die | Set point | 430 | 221 |

TABLE 9-continued

Extruder conditions for Lab Tech Blown Film Line for samples with polyamide layer

| Extruders | Zones | Temperature | (° F.) | (° C.) |
|---|---|---|---|---|
| Extruder 3: Polyamide (Ultramid ™ C33L01 or Polyamide UBE 5033B) | Zone 01 | Set point | 400 | 204 |
| | Zone 02 | Set point | 450 | 232 |
| | Zone 03 | Set point | 450 | 232 |
| | Die | Set point | 450 | 232 |

TABLE 10

Extruder conditions for Lab Tech Blown Film Line for samples with EVOH layer

| Extruders | Zones | Temperature | (° F.) | (° C.) |
|---|---|---|---|---|
| Extruders 1 and 5: PP (6D83K) | Zone 01 | Set point | 400 | 204 |
| | Zone 02 | Set point | 425 | 218 |
| | Zone 03 | Set point | 385 | 196 |
| | Zone 04 | Set point | 385 | 196 |
| | Die | Set point | 430 | 221 |
| Extruders 2 and 4: Tie | Zone 01 | Set point | 375 | 191 |
| | Zone 02 | Set point | 400 | 204 |
| | Zone 03 | Set point | 385 | 196 |
| | Die | Set point | 430 | 221 |

TABLE 10-continued

Extruder conditions for Lab Tech Blown Film Line for samples with EVOH layer

| Extruders | Zones | Temperature | (° F.) | (° C.) |
|---|---|---|---|---|
| Extruder 3: EVOH (EVAL ™ H171B) | Zone 01 | Set point | 330 | 166 |
| | Zone 02 | Set point | 400 | 204 |
| | Zone 03 | Set point | 400 | 204 |
| | Die | Set point | 430 | 221 |

The adhesion and haze results for blown film structures containing polyamide are shown in Table 11. Ex. 9 to 13 show excellent adhesion property both before and after retort as compared to PP based tie layers (Ex. C and D). It is noted that Ex 9-11 uses MAH-g-HDPE (MAHPECONC1) as MAH grafted polyolefin, Ex 12 uses MAH-g-HDPE (MAHPECONC2) as MAH grafted polyolefin, whereas Ex 13 uses MAH-g-PP (MAHPPCONC) as MAH grafted polyolefin. Ex. 16 contains only MAH-g-HDPE (MAHPECONC1) and CBC 3 and does not contain an elastomer. In terms of haze, Ex. 9-13 have the value from 6 to 8% before retort and 13 to 15% after retort. Ex. 9-13 also show good film smoothness after retort.

TABLE 11

Tie Interlayer adhesion and haze results of blown films produced on Lab Tech Line (Barrier layer being Polyamide C33L01)

| | Tie layer formulations | | | | | | | Adhesion (N/15 mm) | | Haze (%) | |
|---|---|---|---|---|---|---|---|---|---|---|---|
| Example | MAHPECONC1 | MAHPECONC2 | MAHPPCONC | CBC3 | ENGAGE 8150 | ELITE 5100G | ELITE 5940G | Before retort | After retort | Before retort | After retort |
| 9 | 20 | 0 | 0 | 50 | 20 | 0 | 10 | 11.1 | 10.5 | 8.3 | 14.8 |
| 10 | 20 | 0 | 0 | 50 | 20 | 10 | 0 | 10.9 | 9.4 | 7.9 | 13.8 |
| 11 | 20 | 0 | 0 | 60 | 20 | 0 | 0 | 12.6 | 10.1 | 8.3 | 14.7 |
| 12 | 0 | 12 | 0 | 60 | 20 | 0 | 8 | 10.3 | 11.4 | 6.9 | 13.9 |
| 13 | 0 | 0 | 20 | 60 | 20 | 0 | 0 | 12.2 | 9.3 | 5.8 | 13.7 |
| 16* | 20 | 0 | 0 | 80 | 0 | 0 | 0 | 6.1 | 5.1 | 6.7 | 13.1 |
| C | | | TY2451 | | | | | 7.9 | 6.9 | 10.2 | 15.0 |
| D* | | | PPTIE1 | | | | | 7.9 | 6.1 | 6.9 | 13.1 |

For Ex. 16 and D, the bather layer is polyamide UBE 5033B. The adhesion and haze results for blown film structures containing EVOH (EVAL™ H171B) are shown in Table 12. Ex. 14 and 15 show superior adhesion property both before and after retort as compared to PP based tie layer (Ex. E).

TABLE 12

Tie Interlayer adhesion and haze results of blown films produced on Lab Tech Line (Barrier layer being EVOH EVAL ™ H171B)

| | Tie layer formulations | | | | | | | Adhesion (N/15 mm) | |
|---|---|---|---|---|---|---|---|---|---|
| Ex | MAHPECONC1 | MAHPECONC2 | MAHPPCONC | CBC3 | ENGAGE 8150 | ELITE 5100G | ELITE 5940G | Before retort | After retort |
| 14 | 20 | 0 | 0 | 50 | 20 | 0 | 10 | 8.7 | 10.6 |
| 15 | 20 | 0 | 0 | 60 | 20 | 0 | 0 | 5.2 | 8.3 |
| E | | | TY2451 | | | | | 2.7 | 2.5 |

Blown Film Process on Alpine Blown Film Line

Five layer films in an A/B/C/B/D structure Error! Reference source not found. are blown on an Alpine 7-Layer Blown Film Line. Layer A is the sealant layer, B is the tie layer, C is the barrier layer and D is the skin layer. PP 6D83K is used as sealant layer A. Both Polyamide (Ultramid™ C40LN07) and EVOH (EVAL™ F171B) are used as the barrier layer C. PP H110-02N is used as skin layer D. The diameter of the extrusion die is 250 mm and die gap is 2 mm. The die output is 11.35 lb per inch die circumference. The blow-up ratio (BUR) is 2.5 and draw down ratio is 7.86. The total film thickness of 100 um and 50 um are made. The nip speed is 46.5 ft/min for 100 um thick film, whereas the nip speed is 93.0 ft/min for 50 um thick film. When polyamide C40LN07 is used as barrier layer, the layer structure is A/B/C/B/D (34/6/20/6/34%). When EVOH F171B is used as barrier layer, the layer structure is A/B/C/B/D (39/6/10/6/39%). The line has 7 extruders. Extruders and 1 and 2 are used for sealant layer A, extruders 3 and 5 are used for tie layers B, extruder 5 is used for barrier layer C and Extruders and 6 and 7 are used for skin layer D. The extruder temperature profiles are shown in Table 13 for samples with polyamide as barrier. The extruder temperature profiles are shown in Table 14 for samples with EVOH as barrier.

TABLE 13

Extruder conditions for Lab Tech Blown Film Line for samples with polyamide layer

| Extruders | Zones | Temperature | (° F.) | (° C.) |
|---|---|---|---|---|
| Extruders 1 and 2: RCP (6D83K) | Zone 1 | Set point | 150 | 66 |
|  | Zone 2-5 | Set point | 400 | 204 |
|  | Zone 6-8 | Set point | 450 | 232 |
| Extruders 3 and 5: Tie | Zone 1 | Set point | 70 | 21 |
|  | Zone 2-5 | Set point | 380 | 193 |
|  | Zone 6-7 | Set point | 450 | 232 |
| Extruder 4: Polyamide (Ultramid ™ C40LN07) | Zone 1 | Set point | 350 | 177 |
|  | Zone 2-5 | Set point | 425 | 218 |
|  | Zone 6-8 | Set point | 450 | 232 |

TABLE 13-continued

Extruder conditions for Lab Tech Blown Film Line for samples with polyamide layer

| Extruders | Zones | Temperature | (° F.) | (° C.) |
|---|---|---|---|---|
| Extruders 6 and 7: PP (H110) | Zone 1 | Set point | 350 | 177 |
|  | Zone 2-5 | Set point | 400 | 204 |
|  | Zone 6-8 | Set point | 450 | 232 |
| Die |  | Set point | 450 | 232 |

TABLE 14

Extruder conditions for Lab Tech Blown Film Line for samples with EVOH layer

| Extruders | Zones | Temperature | (° F.) | (° C.) |
|---|---|---|---|---|
| Extruders 1 and 2: RCP (6D83K) | Zone 1 | Set point | 150 | 66 |
|  | Zone 2-5 | Set point | 400 | 204 |
|  | Zone 6-8 | Set point | 450 | 232 |
| Extruders 3 and 5: Tie | Zone 1 | Set point | 70 | 21 |
|  | Zone 2-5 | Set point | 380 | 193 |
|  | Zone 6-7 | Set point | 450 | 232 |
| Extruder 4: EVOH (EVAL ™ F171B) | Zone 1 | Set point | 315 | 157 |
|  | Zone 2-3 | Set point | 415 | 213 |
|  | Zone 4-5 | Set point | 420 | 216 |
|  | Zone 6-8 | Set point | 450 | 232 |
| Extruders 6 and 7: PP (H110) | Zone 1 | Set point | 350 | 177 |
|  | Zone 2-5 | Set point | 400 | 204 |
|  | Zone 6-8 | Set point | 450 | 232 |
| Die |  | Set point | 450 | 232 |

The testing results for 100 um thick films containing polyamide layer produced on Alpine Blown Film Line are shown in Table 15. The standard deviation of adhesion test is shown in the parenthesis. Ex. 16 to 18 show comparable adhesion strength both before and after retort as compared to PP based tie layers (Ex. F, G and H). The haze of Ex. 16-18 is similar to the comparative examples as well. Ex. 9-13 also show good film smoothness after retort.

Figure 5:
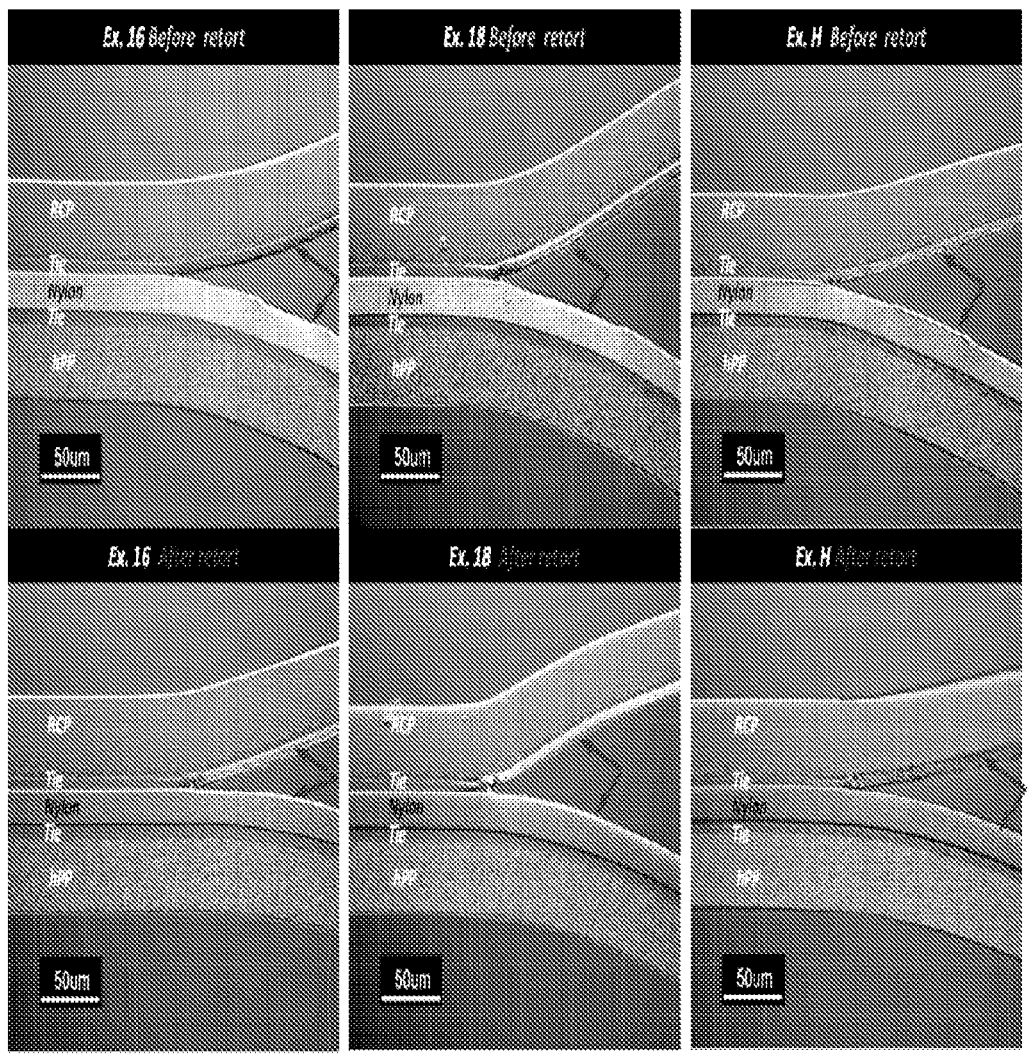
FIG. 5 shows delamination analysis for Ex 16, 18 and H before and after retort.

Optical microscopy is performed to identify the delamination interface. As shown in FIG. 5, examination of optical cross sections from peel tested structures indicates that failures occur in the same location for Ex. 16, 18 and H. Adhesive failures are observed along the interfacial boundary between the polyamide layer and the tie layer.

TABLE 15

Tie Interlayer adhesion and haze results of 100 um films produced on Alpine Blown Film Line (Barrier layer being Polyamide C40LN07)

| Example | MAHPECONC1 | MAHPECONC2 | CBC3 | ENGAGE 8150 | ELITE 5940G | Avg Adhesion (N/15 mm) Before retort | Avg Adhesion (N/15 mm) After retort | Avg Haze (%) Before retort | Avg Haze (%) After retort |
|---|---|---|---|---|---|---|---|---|---|
| 16 | 20 |  | 50 | 20 | 10 | 7.6 (2.1) | 9.1 (0.6) | 16.5 | 18.0 |
| 17 | 20 |  | 60 | 20 |  | 9.1 (0.1) | 8.6 (0.2) | 16.6 | 17.6 |
| 18 |  | 12 | 60 | 20 | 8 | 8.5 (0.2) | 13.0 (0.6) | 16.4 | 17.6 |
| F |  | TY2551 |  |  |  | 9.5 (0.5) | 9.8 (0.4) | 19.2 | 21.7 |
| G |  | PPTIE1 |  |  |  | 9.7 (2.0) | 9.0 (0.3) | 16.2 | 17.6 |
| H |  | Admer QF551 |  |  |  | 8.3 (0.6) | 8.4 (0.2) | 16.8 | 18.6 |

The testing results for 100 um thick films containing EVOH (EVAL™ F171B) layer produced on Alpine Blown Film Line are shown in Table 16. The standard deviation of adhesion test is shown in the parenthesis. Ex. 19 to 21 show stronger adhesion both before and after retort then the PP based tie layer (Ex. I to K).

TABLE 16

Tie Interlayer adhesion and haze results of blown films produced on Alpine Line (Barrier layer being EVOH EVAL ™ F171B)

| Example | MAHPECONC1 | MAHPECONC2 | CBC3 | ENGAGE 8150 | ELITE 5940G | Avg Adhesion (N/15 mm) Before retort | Avg Adhesion (N/15 mm) After retort | Avg Haze (%) Before retort | Avg Haze (%) After retort |
|---|---|---|---|---|---|---|---|---|---|
| 19 | 20 | | 50 | 20 | 10 | 9.1 (0.3) | 9.8 (0.7) | 18.5 | 19.4 |
| 20 | 20 | | 60 | 20 | | 9.1 (0.3) | 9.7 (0.3) | 17.5 | 18.1 |
| 21 | | 12 | 60 | 20 | 8 | 9.1 (0.6) | 9.2 (0.3) | 16.4 | 18.4 |
| I | | TY2551 | | | | 5.6 (0.2) | 5.1 (0.1) | 20.1 | 20.1 |
| J | | PPTIE1 | | | | 6.4 (0.4) | 5.6 (0.1) | 17.2 | 16.7 |
| K | | Admer QF551 | | | | 8.1 (0.5) | 7.3 (0.1) | 17.1 | 18.6 |

Blown Film on Lab Tech Blown Film Line for PE Based Structure

A polyethylene/polyamide tie layer trial was conducted to test if the invention can be used as tie layer for polyethylene/polyamide. Similar five layer films in A/B/C/B/A structures were blown on the Lab Tech 5-Layer Blown Film Line. The diameter of the extrusion die was 75 mm and the die gap 2 mm. The blow-up ratio (BUR) was 2.5 and lay-flat width 11.6 inch. The nip speed was 14.5 ft/min. The total film thickness was 100 um, in which A was the skin layer, B was the tie layer and C was the barrier layer. DOWLEX 2045G was used as skin layers. Polyamide Ultramid™ C33L01 was used as a barrier layer. The layer structure was A/B/C/B/A (30/10/20/10/30 um). The line had 5 extruders. Extruders 1 and 5 were used for skin layers, extruders 2 and 4 for tie layers and extruder 3 for barrier layers. The extruder temperature profiles are shown in Error! Reference source not found.

TABLE 17

Extruder conditions for Lab Tech Blown Film Line for polyethylene/polyamide structures

| Extruders | Zones | Temperature | (° F.) | (° C.) |
|---|---|---|---|---|
| Extruders 1 and 5: DOWLEX 2045G | Zone 01 | Set point | 375 | 190 |
| | Zone 02 | Set point | 420 | 215 |
| | Zone 03 | Set point | 375 | 190 |
| | Zone 04 | Set point | 375 | 190 |
| | Die | Set point | 430 | 221 |
| Extruders 2 and 4: Tie | Zone 01 | Set point | 375 | 190 |
| | Zone 02 | Set point | 400 | 204 |
| | Zone 03 | Set point | 390 | 199 |
| | Die | Set point | 420 | 215 |

TABLE 17-continued

Extruder conditions for Lab Tech Blown Film Line for polyethylene/polyamide structures

| Extruders | Zones | Temperature | (° F.) | (° C.) |
|---|---|---|---|---|
| Extruder 3: Polyamide (Ultramid ™ C33L01) | Zone 01 | Set point | 400 | 204 |
| | Zone 02 | Set point | 450 | 232 |
| | Zone 03 | Set point | 450 | 232 |
| | Die | Set point | 450 | 232 |

The inventive tie layers, PP based tie layers and PE based tie layers are compared in Table 18. For PE/polyamide tie layers, the minimum acceptable adhesion level for 4 mil films is above ~7 N/15 mm. As can be seen in Table 18, PP based tie layers, Ex L and M, do not meet the adhesion requirement, whereas inventive Ex 22 and 23 and commercial PE based tie layers (Ex. N and O) pass the adhesion requirement.

Figure 6:
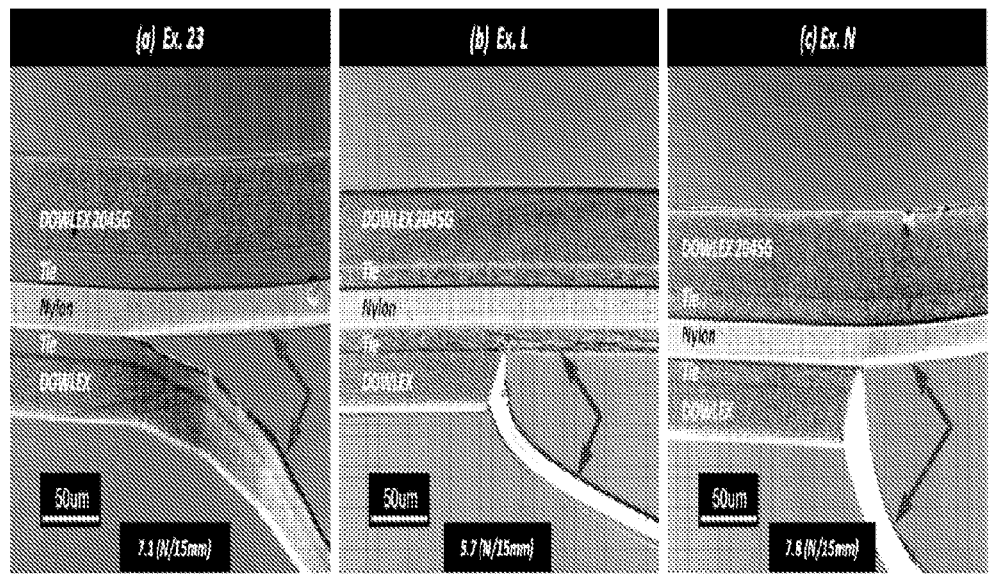
FIG. 6 shows delamination analysis for Ex 23, L and N before and after retort.

Comparison of the peel test failures revealed difference in delamination location, FIG. 6. Adhesive interfacial failure between the tie layer and polyamide layer occurred for formulations made with inventive tie layer 23, FIG. 6a. The same delamination location was observed for PE based tie layer AMPLIFY TY 1353 (Ex. N), FIG. 6c. Conversely, for a PP based tie-layer Ex. L, adhesive failure between the outer DOWLEX 2045G layer and PP based tie layer occurred, FIG. 19b. Poor compatibility between PP and PE made the interface of tie/DOWLEX 2045G the weak link and failure point.

TABLE 18

Results of blown films consisting DOWLEX 2045G as skins

| Category | EX. | MAHPECONC1 | CBC3 | ENGAGE 8150 | ELITE 5940G | Adhesion (N/15 mm) | Haze (%) |
|---|---|---|---|---|---|---|---|
| Inventive tie layer | 22 | 20 | 50 | 20 | 10 | 7.5 | 12.3 |
|  | 23 | 20 | 60 | 20 | 0 | 7.1 | 12.6 |
| PP based tie layer | L | ADMER QF 551 | | | | 5.7 | 12.4 |
|  | M | AMPLIFY TY 2551 | | | | 5.3 | 13.8 |
| PE based tie layer | N | AMPLIFY TY 1353 | | | | 7.8 | 14.7 |
|  | O | AMPLIFY TY 1228B | | | | 8.9 | 13.8 |

Thermoforming Examples

A thermoforming trial was conducted to test if the invention can be used as tie layer for thermoforming application. Seven layer films in A/B/C/D/C/B/E structures were blown on the Alpine 7-Layer Blown Film Line. Layer A is sealant layer (RCP 6D83K), B is the tie layer, C is Polyamide (Ultramid™ B36 01), D is EVOH (EVAL™ LR171B) and E is PP H110-02N. The layer structure is A/B/C/D/C/B/E (22.5%/7.5%/12.5%/15.0%/12.5%/7.5%/22.5%). The film thickness is 6 mil (152 um). The total throughput is 425 lb/hr. The diameter of the extrusion die is 250 mm and die gap is 2 mm. The die output is 13.7 lb per inch die circumference. The blow-up ratio (BUR) is 2.5 and draw down ratio is 5.24. The total film thickness of 6 mil (152.4 um) are made. The nip speed is 35.9 ft/min. The line has 7 extruders. Extruder 1 is used for sealant layer A, extruders 2 and 6 are used for tie layers B, extruders 3 and 5 used for layer C, extruder 4 for layer D and extruder 7 layer E. The extruder temperature profiles are shown in Table 19.

TABLE 19

Extruder conditions for Alpine Blown Film Line for thermoforming trial

| Extruders | Zones | Temperature | (° F.) | (° C.) |
|---|---|---|---|---|
| Extruders 1 and 7 | Zone 1 | Set point | 70 | 21 |
|  | Zone 2-5 | Set point | 380 | 193 |
|  | Zone 6-8 | Set point | 450 | 232 |
| Extruders 2 and 6 | Zone 1 | Set point | 70 | 21 |
|  | Zone 2-5 | Set point | 350 | 177 |
|  | Zone 6-7 | Set point | 400 | 204 |
| Extruders 3 and 5 | Zone 1 | Set point | 420 | 216 |
|  | Zone 2-8 | Set point | 500 | 260 |
| Extruder 4 | Zone 1 | Set point | 400 | 204 |
|  | Zone 2-5 | Set point | 450 | 232 |
|  | Zone 6-8 | Set point | 460 | 238 |
| Die |  | Set point | 500 | 260 |

The blown films were subsequently thermoformed on a Multivac R530 thermoforming machine. The forming depth is 63.5 mm. The die temperature is 135° C., with 7 sec dwell time for heating and 5 sec dwell time for forming. After drawing, a cup dimension of 18 (length)×12 (width)×6 (depth) cm is formed. The bottom film of the formed cup has a thickness of 1.0 mil (25.4 um). The adhesion and heat seal testing are performed on the film taken from bottom of the formed cups.

After thermoforming, the inventive tie layer Ex 24 has an adhesion value of 2.4 N/15 mm before retort, which is comparable to PP based tie layer example P (2.9 N/15 mm) After retort, Ex 24 shows significantly higher adhesion than the comparative example P.

TABLE 20

Adhesion of films taken from the bottom of thermoformed cups

| Category | EX. | MAHPECONC1 | CBC4 | AFFINITY EG 8100 8100 | Irganox B215 | Adhesion Before retort (N/15 mm) | Adhesion After retort (N/15 mm) |
|---|---|---|---|---|---|---|---|
| Inventive tie layer | 24 | 20 | 59.82 | 20 | 0.18 | 2.4 | 6.3 |
| PP based tie layer | P | AMPLIFY TY 2551 | | | | 2.9 | 4.4 |

Figure 7:
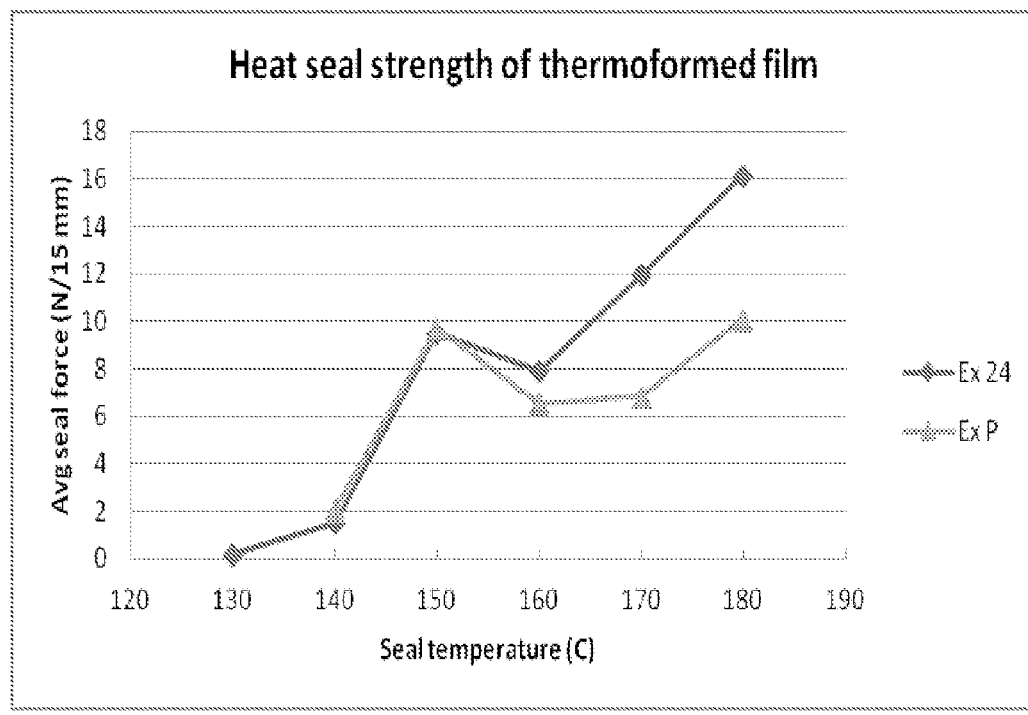
FIG. 7 shows heat seal strength of films taken from bottom of thermoformed cups.

The heat seal strength of thermoformed films taken from the bottom of thermoformed cups is shown in FIG. 7. The seal strength of Ex 24 is significantly higher than the comparative example P.

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, definitions (to the extent not inconsistent with any definitions specifically provided in this disclosure), and general knowledge in the art.

What is claimed is:

1. A multilayer structure comprising a polypropylene layer which is Layer A, a tie layer which is Layer B, and a barrier layer which is Layer C, each layer having opposing facial surfaces in adhering contact with the other layer, wherein:

Layer A has a top facial surface and a bottom facial surface and comprises polypropylene;

Layer B has a top facial surface and a bottom facial surface and comprises:
  a) a crystalline block copolymer composite (CBC) comprising:
    i) an ethylene polymer (EP) comprising at least 90 mol % polymerized ethylene;

ii) an alpha-olefin-based crystalline polymer (CAOP) and iii) a block copolymer comprising (a) an ethylene polymer block comprising at least 90 mol % polymerized ethylene and (b) a crystalline alpha-olefin block (CAOB);

b) a polyolefin elastomer or plastomer;

c) maleic anhydride grafted polyethylene (MAH-g-PE) or maleic anhydride grafted polypropylene (MAH-g-PP); and, optionally, d) polypropylene or polyethylene; and, Layer C comprises a polyamide (PA) or ethylene vinyl alcohol (EVOH) and has a top facial surface and a bottom facial surface, wherein the top facial surface of Layer C is in adhering contact with the bottom facial surface of Layer B, and the top facial surface of Layer B is in adhering contact with the bottom facial surface of Layer A, wherein the crystalline block copolymer composite of Layer B is present in an amount of at least 40 weight percent based on total polymer weight in Layer B, and wherein Layer B provides an interlayer adhesion value between Layer A and Layer C of greater than 7 N/15 mm before and after the multilayer structure is subjected to a retort process.

2. The multilayer structure of claim 1 wherein Layer B further comprises a polypropylene.

3. The multilayer structure of claim 1 wherein Layer B further comprises a polyethylene.

4. The multilayer structure of claim 1 wherein the structure has a thickness of 25 microns to 2.5 cm.

5. The multilayer structure of claim 1 wherein the structure is a cast film or a blown film.

6. The multilayer structure of claim 5 wherein the multilayer structure has a film thickness of at least 3 mil.

7. A multilayer structure comprising a polypropylene layer which is Layer A, a tie layer which is Layer B, and a barrier layer which is Layer C, each layer having opposing facial surfaces in adhering contact with the other layer, wherein:

Layer A has a top facial surface and a bottom facial surface and comprises polypropylene;

Layer B has a top facial surface and a bottom facial surface and comprises:

a) a crystalline block copolymer composite (CBC) comprising:

i) an ethylene polymer (EP) comprising at least 90 mol % polymerized ethylene;

ii) an alpha-olefin-based crystalline polymer (CAOP) and iii) a block copolymer comprising (a) an ethylene polymer block comprising at least 90 mol % polymerized ethylene and (b) a crystalline alpha-olefin block (CAOB);

b) a polyolefin elastomer;

c) maleic anhydride grafted polyethylene (MAH-g-PE) or maleic anhydride grafted polypropylene (MAH-g-PP); and, optionally, d) polypropylene or polyethylene; and, Layer C comprises a polyamide (PA) or ethylene vinyl alcohol (EVOH) and has a top facial surface and a bottom facial surface, wherein the top facial surface of Layer C is in adhering contact with the bottom facial surface of Layer B, and the top facial surface of Layer B is in adhering contact with the bottom facial surface of Layer A, wherein the crystalline block copolymer composite of Layer B is present in an amount of at least 40 weight percent based on total polymer weight in Layer B, wherein Layer B provides an interlayer adhesion value between Layer A and Layer C of greater than 5 N/15 mm after the multilayer structure is subjected to a retort process, and wherein the multilayer structure is a thermoformed film.

* * * * *